(12) United States Patent
Hayton et al.

(10) Patent No.: US 9,306,737 B2
(45) Date of Patent: Apr. 5, 2016

(54) SYSTEMS AND METHODS FOR SECURE HANDLING OF DATA

(75) Inventors: Richard Hayton, Cambridge (GB); Andrew Innes, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 330 days.

(21) Appl. No.: 13/475,082

(22) Filed: May 18, 2012

(65) Prior Publication Data

US 2012/0297189 A1    Nov. 22, 2012

Related U.S. Application Data

(60) Provisional application No. 61/487,519, filed on May 18, 2011.

(51) Int. Cl.
| | |
|---|---|
| H04L 9/12 | (2006.01) |
| H04L 9/08 | (2006.01) |
| H04L 29/06 | (2006.01) |
| G06F 21/62 | (2013.01) |
| G06F 17/30 | (2006.01) |
| H04L 9/16 | (2006.01) |
| G06F 21/78 | (2013.01) |

(52) U.S. Cl.
CPC ........ *H04L 9/0822* (2013.01); *G06F 17/30203* (2013.01); *G06F 21/6272* (2013.01); *H04L 9/083* (2013.01); *H04L 9/088* (2013.01); *H04L 9/0825* (2013.01); *H04L 9/16* (2013.01); *H04L 63/045* (2013.01); *G06F 2221/2115* (2013.01); *H04L 63/105* (2013.01)

(58) Field of Classification Search
CPC ................ H04L 9/0822; H04L 9/0838; G06F 2212/263; G06F 2212/261; G06F 21/10; G06F 21/60; G06F 21/80; G06F 2221/2107; G06F 17/30203; G11B 20/0021
See application file for complete search history.

(56) References Cited

U.S. PATENT DOCUMENTS

| | | | | |
|---|---|---|---|---|
| 4,888,800 | A * | 12/1989 | Marshall et al. | 380/281 |
| 7,257,707 | B2 * | 8/2007 | England et al. | 713/164 |
| 7,412,059 | B1 * | 8/2008 | Pauker et al. | 380/277 |
| 7,802,106 | B2 * | 9/2010 | Benardeau | 713/189 |
| 7,840,730 | B2 * | 11/2010 | D'Amato et al. | 710/74 |
| 2006/0126850 | A1 * | 6/2006 | Dawson et al. | 380/284 |
| 2006/0129811 | A1 * | 6/2006 | Fiske | 713/167 |
| 2007/0094503 | A1 * | 4/2007 | Ramakrishna | 713/172 |

(Continued)

OTHER PUBLICATIONS

Secure Group Services for Storage Area networks. Kim et al. IEEE(2003).*
Using IBM Tivoli key Lifecycle Manager: Business Benefits and Architecture Overview. IBM(2009).*

*Primary Examiner* — Venkat Perungavoor
(74) *Attorney, Agent, or Firm* — Banner & Witcoff, Ltd.

(57) ABSTRACT

The methods and systems described herein provide for secure implementation of external storage providers in an enterprise setting. Specifically, the present invention provides for allowing the secure use of processes that may transmit files to external storage providers or access files from an external storage provider. In some arrangements, process, such as an untrusted process, may request access to a file. A security agent may intercept the request and encrypt the file. The file can then be transmitted to the external storage provider. A user may subsequently request access to the file. A security agent may intercept a message in connection with this request, determine whether the user is authorized to access the file, and decrypt the file.

20 Claims, 24 Drawing Sheets

(56) References Cited

U.S. PATENT DOCUMENTS

2009/0119785 A1*  5/2009  Challener et al. ............... 726/34
2010/0008499 A1*  1/2010  Lee et al. ........................ 380/46
2011/0191858 A1*  8/2011  Shapiro et al. .................. 726/27
2011/0252236 A1* 10/2011  De Atley et al. .............. 713/168

* cited by examiner

SYSTEMS AND METHODS FOR SECURE HANDLING OF DATA

CROSS REFERENCE TO RELATED APPLICATIONS

This application claims priority to co-pending U.S. provisional application Ser. No. 61/487,519, filed May 18, 2011, entitled "SYSTEMS AND METHODS FOR SECURE HANDLING OF DATA ACCESSED BY SYNCHRONIZATION PROGRAMS." The above identified application is incorporated herein by reference in its entirety.

FIELD

The present disclosure relates to the use of external storage providers in an enterprise network. In particular, the present disclosure relates to methods and systems for securing data before being accessed by programs and transmitted to an external storage provider or external storage facility.

BACKGROUND

The growth of software as a service (SaaS) solutions for file storage and delivery has provided challenges for enterprise network administrators that seek to control and secure data on their network. SaaS solutions are sometimes referred to as solutions provided in "the Cloud." One drawback in choosing to use services provided by an external storage provider is that an enterprise risks exposing sensitive data to an untrusted third party. For example, the data may be subject to the policies and control of the external service provider rather than that of the enterprise network. The enterprise may thus be unable to enforce policies such as its own password requirements when working with externally stored data. The enterprise may also be unable to track where files are kept by users of the external storage provider.

Furthermore, external storage providers can operate in an all-or-nothing approach to providing users with access. That is, an external storage provider may provide storage services to a particular user or to an entire corporation. However, the present solutions do not provide the ability for implementing the more granular approach to file access that exists in typical enterprise network settings. For example, an enterprise network may typically involve a variety of different user groups who may have varying degrees of access to different files (whether broken down by organization hierarchy or different groups within an organization). Such a granular approach to granting and authorizing access to files according to groups of users within an enterprise network is currently unavailable to those wishing to combine their enterprise network with the services provided by external storage providers.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

In one embodiment, the methods and systems described herein provide various functionality for implementing the security and control of an enterprise network with the services provided by an external storage provider. In particular, the invention provides systems and methods for secure handling of files accessed by one or more processes executing on a client computer, such as an untrusted process or program. In some embodiments, the processes executing on a client computer may be utility programs provided by the external storage provider to enable connection to, and transfer of, files to and from the external storage provider. Such processes may also be synchronization programs designed to update, synchronize, backup, or archive files available within the enterprise network to an external storage provider.

In some embodiments, a method for secure handling of files accessed by one or more processes executing on a client computer may include intercepting, by a security agent executing on a client computer, a message from a process executing on the client computer. The message may be addressed to an external storage provider in communication with the program, and the message may identify a file. The method may also include encrypting, by the security agent, the file using an encryption key, resulting in an encrypted file. The method may further include encrypting, by the security agent, the encryption key with a shared key, resulting in an encrypted encryption key. The method may also include providing the encrypted file and the encrypted encryption key to a location accessible to the process.

Additionally, in some embodiments, a method for secure handling of files accessed by one or more processes executing on a client computer may include intercepting, by a first security agent executing on a first client computer, a request to access a file made by a first untrusted process executing on the first client computer. The method may further include encrypting, by the first security agent, the file using a first encryption key. The method may further include encrypting, by the first security agent, the first encryption key with a shared key. The method may further include providing, by the first security agent to the first untrusted program, the encrypted file and the encrypted first encryption key for transmission to a network. The method may further include intercepting, by a second security agent executing on a second client computer, a request to access the file made by a second untrusted process executing on the second client computer on behalf of a user. The method may further include determining, by the second security agent, that the user is authorized by the centralized service to access the file. The method may further include decrypting, by the second security agent, the encrypted first encryption key with the shared key, responsive to a determination that the user is authorized by the centralized service to access the file. The method may further include decrypting, by the second security agent, the encrypted file with the first encryption key.

In some embodiments, the method for providing secure handling of file access may further include determining that the first untrusted process intends to one of: synchronize, store or transmit a copy of the file to the network. In some embodiments, the method for providing secure handling of files access by one or more untrusted process may further include determining that the file is not encrypted.

In some embodiments, the method for providing secure handling of file access may further include initiating, by the user, the access request.

In some embodiments, the method for providing secure handling of file access may further include initiating, by a second user, the access request.

In some embodiments, the method for providing secure handling of file access may further include initiating, by a second user, the access request, the second user belonging to an audience class assigned to the file.

In some embodiments, the method for providing secure handling of file access may further include generating the first encryption key to comprise a unique key for the file.

In some embodiments, the method for providing secure handling of file access may further include determining that the second untrusted process intends to one of: synchronize, access or transfer a copy of the tagged file from the network.

In some embodiments, the method for providing secure handling of file access may further include declining, by the second security agent, to decrypt the encrypted file responsive to a determination that the user is not authorized by the centralized service to access the file.

In some embodiments, the method for providing secure handling of file access may further include intercepting a request to access a second file that is already encrypted with a second encryption key, and providing a second tagged file to the first untrusted process, the second tagged file tagged with an audience class assigned to the second file and comprising (i) the second file and (ii) the second encryption key encrypted with the shared key.

In some embodiments, the method for providing secure handling of file access may further include specifying, to the centralized service, one or more users authorized to access the file.

In some embodiments, the method for providing secure handling of file access may further include consulting an access list to determine whether the user is authorized to access the file.

In some embodiments, the method for providing secure handling of file access may further include assigning an audience class to the file, the audience class selected from a plurality of predetermined audience classes.

In some embodiments, the method for providing secure handling of file access may further include assigning an audience class to the file, the audience class comprising one or more users authorized to access the file. The method may further include determining that the user belongs to the audience class assigned to the file. The method may further include tagging the encrypted file with an identifier of the audience class. The method may further include tagging the encrypted file with a key to a hash table for determining the audience class assigned to the file. The method may further include encrypting an identifier of the audience class using the shared key. The method may further include encrypting an identifier of the audience class using the first encryption key.

In some embodiments, the method for providing secure handling of file access may further include a method wherein the shared key is a public-private key pair and the method may further include decrypting of the file by the private key.

In one or more embodiments, a system for secure handling of file access may include a centralized service in communication with a plurality of security agents, the centralized service maintaining a shared key. The system may further include a first security agent, executing on a first client computer. The system may further include a first security agent intercepting a request to access a file made by a first untrusted process or program executing on the first client computer. The system may further include a first security agent encrypting the file using a first encryption key. The system may further include a first security agent encrypting the first encryption key with the shared key. The system may further include a first security agent providing, to the first untrusted process, the encrypted file and the encrypted first encryption key for transmission to a network. The system may further include a first security agent and a second security agent. The first security agent and the second security agent may execute on a second client computer and the second security agent may intercept a request to access the file made by a second untrusted process (e.g., on behalf of a user) executing on the second client computer, determine that the user is authorized by the centralized service to access the file, decrypt the encrypted first encryption key with the shared in response to a determination that the user is authorized by the centralized service to access the file, and decrypt the encrypted file with the first encryption key.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
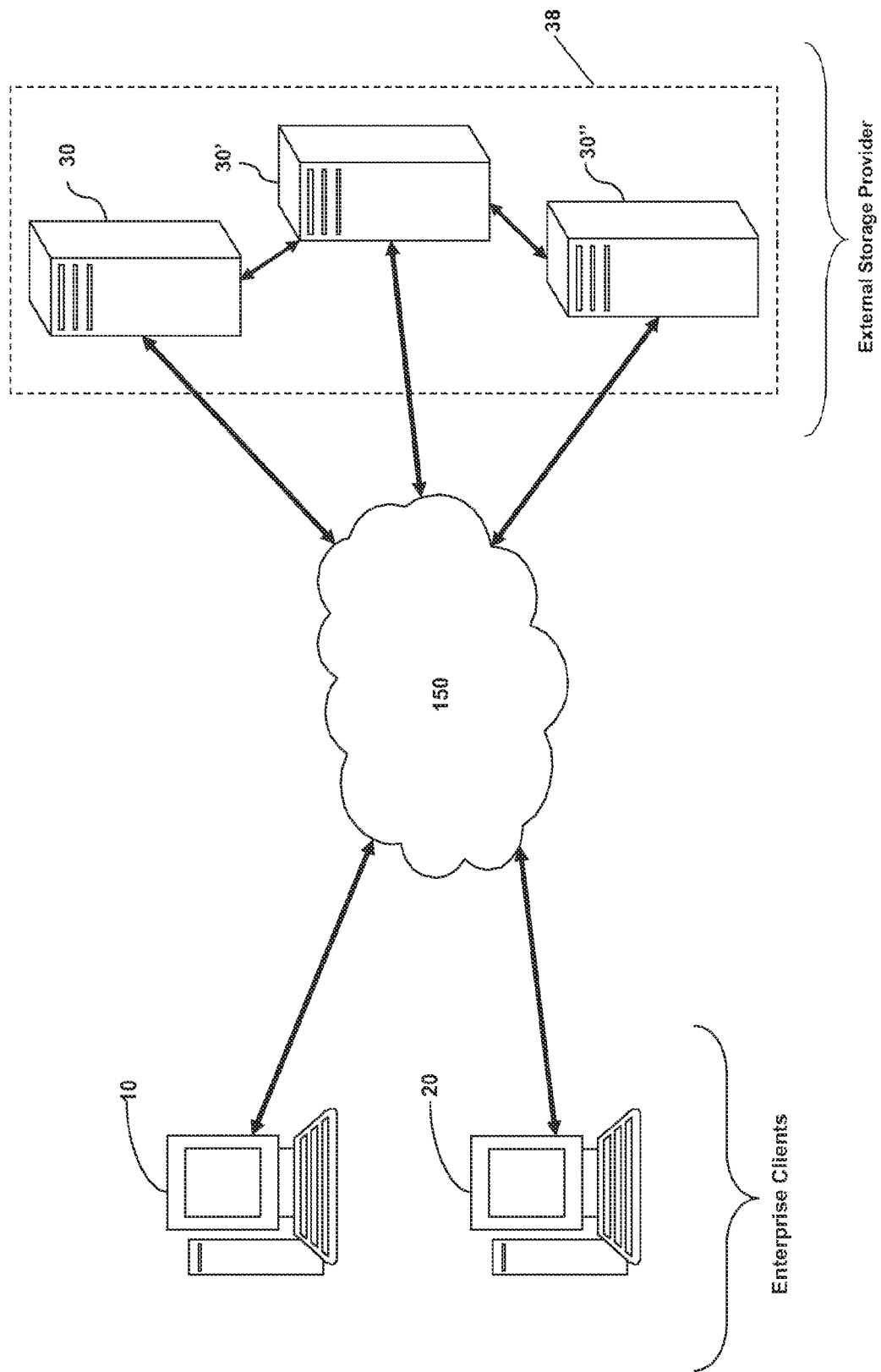
FIG. 1A-1C are block diagrams depicting example embodiments of a network environment comprising client machines in an enterprise network connecting to an external storage provider.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes various encryption schemes and standards useful for practicing the embodiments described herein;

Section B describes a network environment and computing environment which may be useful for practicing embodiments described herein; and Section C describes systems and methods for secure handling of data accessed by programs and describes systems and methods for providing security to file storage by an external storage provider.

A. Encryption Schemes & Standards

Throughout this specification, reference may be made to a "hash function," "hash," or "hashing". These terms are in reference to any procedure or mathematical function that receives data as an input and provides a given output in response to said input. Said output may be referred to as a hash value, or may be referred to as a message digest. The output of a hash may be a single datum or integer. The output of a hash may be a fixed-size bit string. A hash function may rely one or more keys to accomplish said hashing. Examples of hash functions known in the art include MD2 (Message-Digest algorithm), MD4, MD5, SHA-0 (Secure Hash Algorithm), SHA-1, SHA-2, GOST (e.g., standard GOST R 34.11-94 or GOST 34.311-95), HAVAL, PANAM, RadioGatun, RACE Integrity Primitives Evaluation Message Digest (RIPEMD), Tiger, and WHIRLPOOL.

Throughout this specification, reference may be made to a "public key," "public keys," "public key encryption," "public key infrastructure," and "PKI." These terms are in reference to any methods for transforming data into a form that can only be interpreted by the intended recipient, recipients, or audience. Public key encryption methods may involve the use of asymmetric key algorithms, where a key necessary to encrypt data is different from the key needed to decrypt the data. This allows the key with which to encrypt said data, the "Public Key" to be shared widely. Integrity of security is maintained because the separate key with which to decrypt the encrypted information remains secret. The secret key may also be referred to as a private key, and the combination of a public key and corresponding private key may be referred to as a public-private key pair. Thus, public key encryption does not require a secure initial exchange of one or more secret keys. Examples of asymmetric key implementations include Digital Signature Standard (DSS), RSA Encryption Algorithm, Pretty Good Privacy (PGP), Internet Key Exchange, ZRTP, Secure Shell (SSH), Secure Sockets Layer (SSL), Transport Layer Security (TLS), and Secure Internet Live Conferencing (SILC).

It is understood that throughout this disclosure, where public keys or public key encryption is used or disclosed, one could also alternatively use any other form of encryption to successfully implement the systems and methods disclosed herein, including private key encryption or any other form of encryption.

Throughout this specification, reference may be made to encryption. Encryption may refer to any means for transforming data from an interpreted form and securing it by a process that renders the data uninterpretable to anyone but those with the means to decrypt the encrypted data. Encryption may refer to a wide variety of encryption standards and techniques, including private key and public key encryption. Encryption and decryption may be accomplished via a system implementing passwords, keys, or a combination of both. Encryption schemes may include symmetric-key encryption schemes where secret keys are exchanged between the party seeking to encrypt data and the party seeking to decrypt data. Such schemes may also be referred to as "shared secret" or "pre-shared" encryption schemes. Examples of such encryption schemes may include the Advanced Encryption Standard, Blowfish, Twofish, Serpent, CAST5 (also known as CAST-128) or other CAST variant (e.g., CAST 256), Rivest Cipher 4 (RC4) or other RC variant (e.g., ARC4), Triple Data Encryption Standard (Triple DES or 3DES), and International Data Encryption Algorithm (IDEA).

It is understood that throughout this disclosure, where symmetric-key, shared secret encryption, or any other form of encryption is used or disclosed, one could also alternatively use any other form of encryption to successfully implement the systems and methods disclosed herein, including public key encryption or any other form of encryption.

Throughout this specification, reference may be made to a "shared key" or "sharing keys" for the purposes of encryption or decryption. Shared keys are keys which may be shared between a particular group of users. A shared key may be any type or form of key used in any type or form of encryption scheme or standard. In some embodiments, a shared key may be unique to a particular file or may be shared with only a single user, application, or process. In some embodiments, a shared key may be an asymmetric private/public key pair.

B. Network and Computing Environment

Referring now to FIG. 1A, an embodiment of a network environment is depicted. In brief overview, the network environment may comprise one or more client machines, depicted as client machine 10 and client machine 20. A client machine may also generally be referred to as local machine(s), client(s), client node(s), client machine(s), client computer(s), client device(s), endpoint(s), or endpoint node(s). The one or more client machines may be in communication with one or more remote machines 30, 30', and 30" (also generally referred to as server(s) 30 or remote machine(s) 30) via one or more networks 150. In some embodiments, the remote machines may together comprise a server farm 38. Additionally, in some arrangements, the client machines 10 and 20 may be considered part of an enterprise network (e.g., even though they may be mobile devices connected via the Internet). The remote machines 30, 30', 30" or server farm 38 may provide external storage to the client machines and/or any other machine in the enterprise network, and may be considered part of an external storage provider.

Figure 1B:
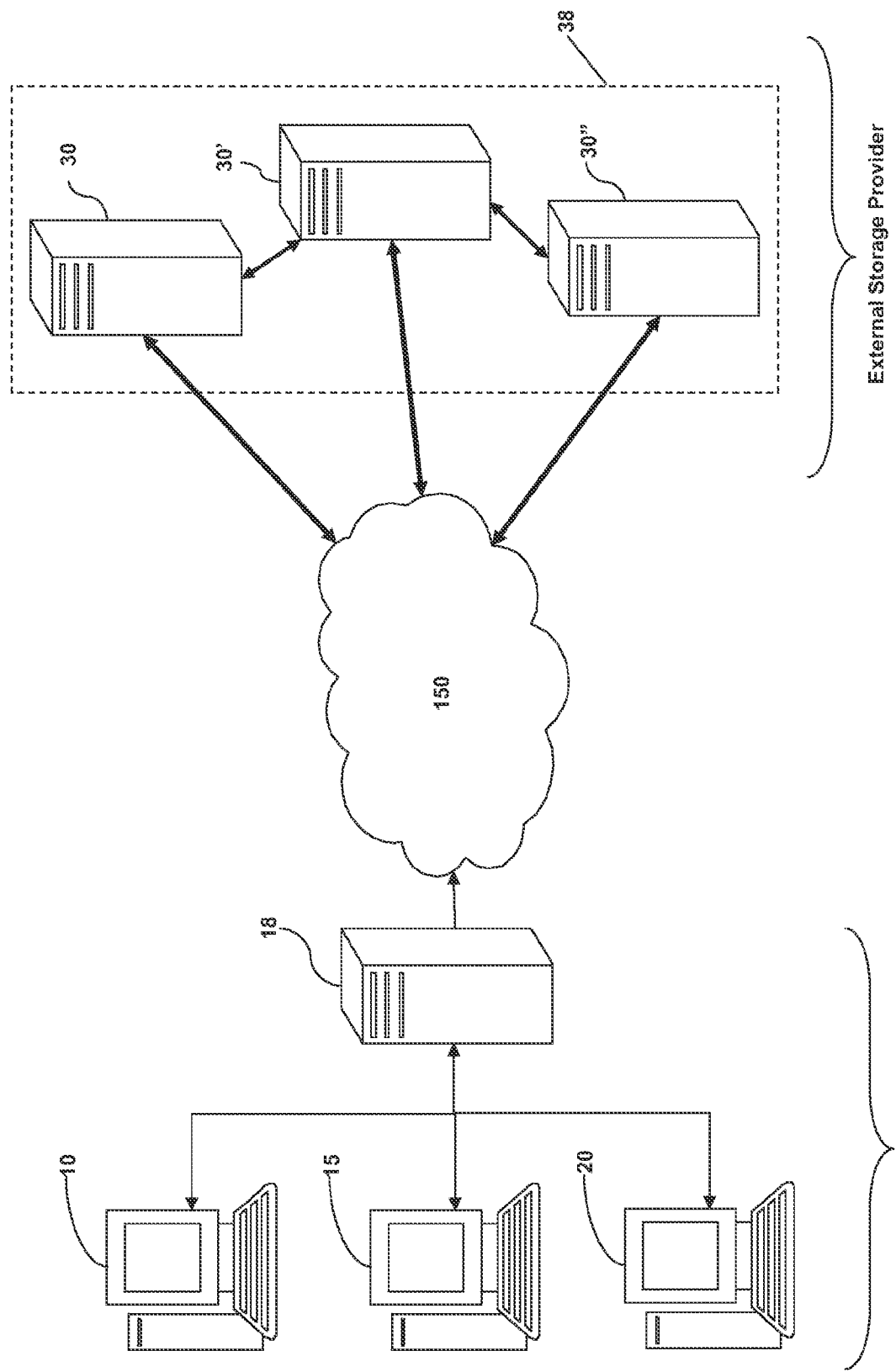

Referring now to FIG. 1B, another embodiment of a network environment is depicted. FIG. 1B includes a similar network environment as that of FIG. 1A, with the addition of machine 18 and client machine 15. In brief overview, the network environment may comprise one or more client machines 10, 15, and 20 in communication with one or more remote machines 30, 30', and 30" via one or more networks 150 and through machine 18 on the enterprise network.

Machine 18 may be a server on the enterprise network providing a security component described in greater detail elsewhere in this disclosure. Machine 18 may also be a computing device much like client machines 10, 15, or 20.

Machine 18 may also be an intermediary network device or server such as a proxy server or firewall server.

Figure 1C:
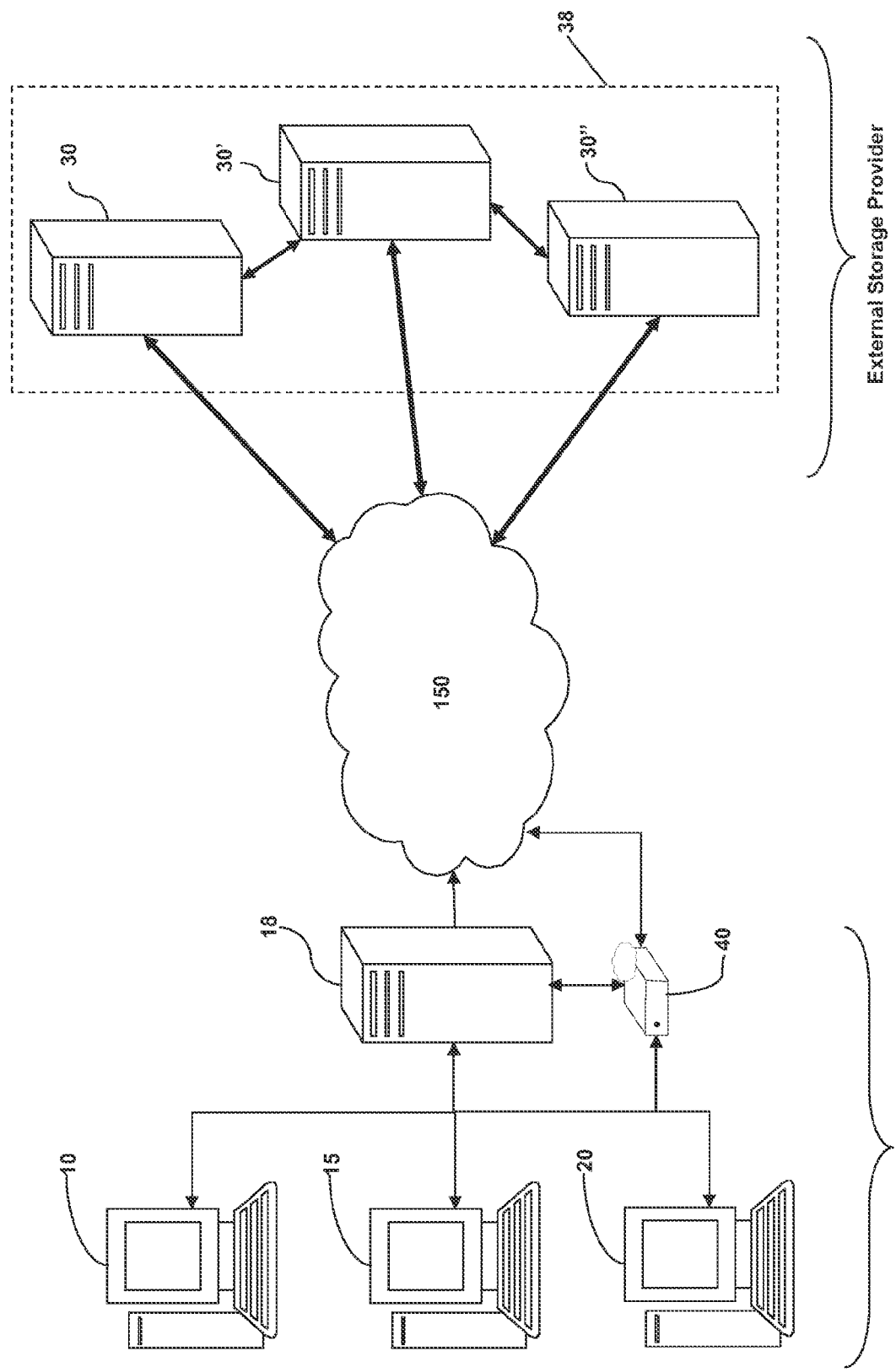

Referring now to FIG. 1C, a similar network environment as that of FIG. 1B is shown with the addition of virtual disk volume 40. Machine 18 is in communication with the virtual disk volume 40 which has been mounted on to the enterprise network and is in communication with remote machines 30, 30', or 30". In one embodiment, the virtual disk volume 40 may be an identifier for the location of externally stored information which is stored by the external storage provider on remote machines 30, 30', or 30". Said identifier may be stored on any machine within the enterprise network, including Machine 18, some other computing device or server in the enterprise network, or on a plurality of server or computing devices within the enterprise network.

Virtual disk volume 40 may be used to access data stored by an external storage provider on remote machines 30, 30', or 30". Virtual disk volume 40 may be located at a client machine 10, a node on the network, machine 18, or on any other device or machine on the enterprise network.

The enterprise network can be a local-area network (LAN), such as a company Intranet, or other network capable of being secured and controlled by a single entity or enterprise. A local-area network may span a wide variety of geographic locations, and can be extended to remote users by a number of technologies known in the art, such as Virtual Private Networking. An external storage provider may be any provider of storage services for files, data, and communications that is external to the enterprise network.

In some embodiments, and external storage provider may be under the control of the same entity controlling the enterprise network. Remote machines 30, 30', or 30" may be part of the enterprise network. In some embodiments, remote machines 30, 30', or 30" may be physically present at the same location as other components of an enterprise network.

The network 150 can be a wide area network, (WAN), such as the public Internet or World Wide Web, or other network capable of connecting an enterprise network with an external storage provider. In some embodiments, the network 150 can be a private network.

The network 150 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 150 may comprise a wireless link, such as an infrared channel or satellite band. The topology of the network 150 may be a bus, star, or ring network topology. The network 150 may be of any such network topology as known to those ordinarily skilled in the art capable of supporting the operations described herein. The network may comprise mobile telephone networks utilizing any protocol or protocols used to communicate among mobile devices, including AMPS (Advanced Mobile Phone Service), TDMA (Time Division Multiple Access), CDMA (Code Division Multiple Access), GSM (Global System for Mobile Communications), GPRS (General Packet Radio Service) or UMTS (Universal Mobile Telecommunications System). In some embodiments, different types of data may be transmitted via different protocols. In other embodiments, the same types of data may be transmitted via different protocols.

In some embodiments, the system may include multiple, logically-grouped remote machines 30, 30', or 30". In one of these embodiments, the logical group of remote machines may be referred to as a server farm 38. In another of these embodiments, the remote machines 30, 30', or 30" may be geographically dispersed. In other embodiments, a server farm 38 may be administered as a single entity. In still other embodiments, the server farm 38 comprises a plurality of server farms (e.g., a collection of geographically diverse server farms). The remote machines within each server farm can be heterogeneous—one or more of the remote machines can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate on according to another type of operating system platform (e.g., Unix or Linux), or any other operating system platform. Alternatively, the remote machines may use the same type of operating system (e.g., all using WINDOWS, or all using Linux, etc.).

The remote machines 30, 30', or 30" of each server farm do not need to be physically proximate to another remote machine in the same server farm. Thus, the group of remote machines logically grouped as a server farm may be interconnected using a wide-area network (WAN) connection or a metropolitan-area network (MAN) connection. For example, a server farm 38 may include remote machines physically located in different continents or different regions of a continent, country, state, city, campus, or room. Data transmission speeds between remote machines in the server farm can be increased if the remote machines are connected using a local-area network (LAN) connection or some form of direct connection.

In one or more embodiments, remote machines 30, 30', or 30" provide data storage services external to an enterprise network. These data storage services may include data storage, file storage, communications storage, backup storage, archival storage, redundant storage, or any other form of storage. These data storage services may transmit and receive data using a variety of different protocols, including TCP/IP (Transfer Control Protocol/Internet Protocol). In some embodiments, the remote machines 30, 30', or 30" may be providing external storage services such as the "Dropbox" service provided by Dropbox, Inc. of San Francisco, Calif.; the "Box.net" service provided by Box.net, Inc. of Palo Alto, Calif.; the "Sugarsync" service provided by Sugarsync, Inc. of San Mateo, Calif.; the "Mozy" service provided by EMC Co. of Hopkinton, Mass.; the "Carbonite" service provided by Carbonite, Inc. of Boston, Mass.; the "ZumoDrive" service provided by Zecter, Inc. of Burlingame, Calif.; the "SkyDrive" service provided by Microsoft Corp. of Redmond, Wash.; and the "MobileMe" service provided by Apple Inc. of Cupertino, Calif.

A client machine 10, 15, or 20 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client machine 10, 15, or 20. In some embodiments, the application may be a server-based or a remote-based application executed by a remote machine (e.g., remote machines 30, 30', or 30") on behalf of a client machine (e.g., client machine 10, 15, or 20). In other embodiments, the remote machine may display output to the client machine using any thin-client protocol, presentation layer protocol, or remote-display protocol, such as the Independent Computing Architecture (ICA) protocol manufactured by Citrix Systems, Inc.

of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

The client machine 10, 15 or 20 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, a client machine may be a mobile computing device, such as a smart phone or tablet computer, including products such as the iPhone or iPad manufactured by Apple, Inc. of Cupertino, Calif.; the BlackBerry devices manufactured by Research in Motion, Ltd. of Waterloo, Ontario, Canada; Windows Mobile devices manufactured by Microsoft Corp., of Redmond, Wash.; the Xoom manufactured by Motorolla, Inc. of Libertyville, Ill.; devices capable of running the Android platform provided by Google, Inc. of Mountain View, Calif. and any other type of mobile computing device. In some arrangements, the mobile computing device may be connected to an enterprise network via the Internet.

In some embodiments, the client machine 10, 15 or 20 may have different processors, operating systems, and input devices consistent with the device. For example, in one embodiment, the client machine 10 may be a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments, the client machine 10 can be a mobile device, such as a JAVA-enabled cellular telephone or personal digital assistant (PDA), such as the i55sr, i58sr, i85s, i88s, i90c, i95c1, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the client machine 10 may be a mobile device manufactured by Nokia of Finland, or by Sony Ericsson Mobile Communications AB of Lund, Sweden.

In still other embodiments, the client machine 10, 15 or 20 may be a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the client machine 10, 15 or 20 may be a smart phone, Pocket PC, Pocket PC Phone, or other handheld mobile device supporting Microsoft Windows Mobile Software. Moreover, the client machine 10, 15 or 20 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1D:
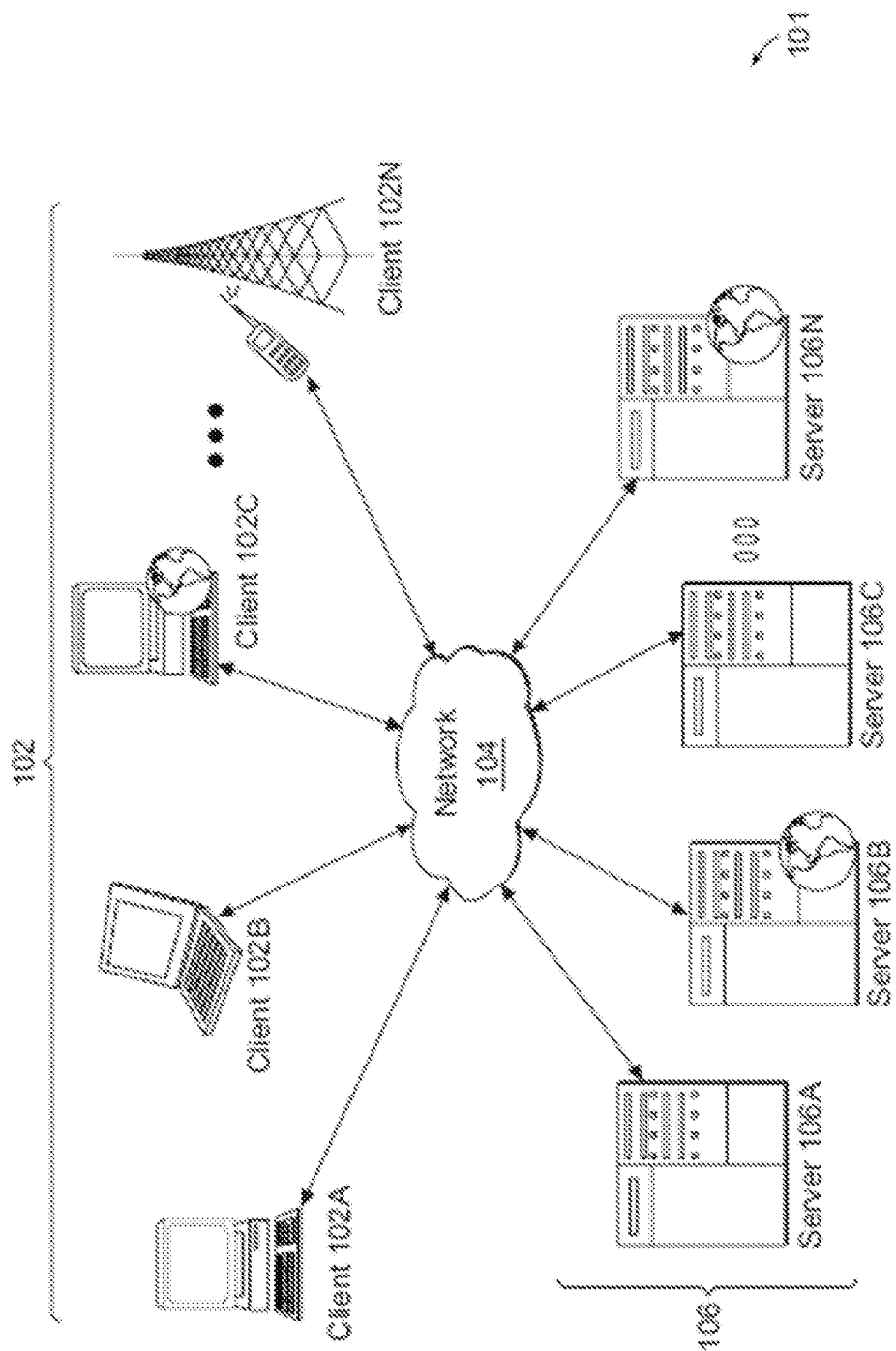
FIG. 1D is a block diagram depicting an example embodiment of a network environment comprising local machines in communication with remote machines.

Referring now to FIG. 1D, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102). The one or more local machines 102a-102n may be in communication with one or more remote machines 106a-106n (also generally referred to as server(s) 106 or remote machine(s) 106) via one or more networks 104. In some embodiments, any or all of local machines 102a-102n has the capacity to function as both a client node seeking access to resources provided by a server and as a server providing access to hosted resources for other local machines.

Although FIG. 1D shows a network 104 between the local machines 102a-102n and the remote machines 106a-106n, the local machines 102a-102n and the remote machines 106a-106n may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102a-102n and the remote machines 106a-106n. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM network, a SONET network, a SDH network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106a-106n. In one of these embodiments, the logical group of remote machines may be referred to as a server farm. In another of these embodiments, the remote machines 106a-106n may be geographically dispersed. In other embodiments, a server farm may be administered as a single entity. In still other embodiments, the server farm comprises a plurality of server farms. The remote machines 106a-106n within each server farm can be heterogeneous—one or more of the remote machines 106a-106n can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate on according to another type of operating system platform (e.g., Unix or Linux).

The remote machines of each server farm do not need to be physically proximate to another remote machine in the same server farm. Thus, the group of remote machines 106a-106n logically grouped as a server farm may be interconnected using a wide-area network (WAN) connection or a metropolitan-area network (MAN) connection. For example, a server farm may include remote machines 106a-106n physically located in different continents or different regions of a continent, country, state, city, campus, or room. Data transmission speeds between remote machines 106a-106n in the server farm can be increased if the remote machines 106a-106n are connected using a local-area network (LAN) connection or some form of direct connection.

Any or all of remote machines 106a-106n may be a file server, application server, web server, proxy server, appliance, network appliance, gateway, application gateway, gateway server, virtualization server, deployment server, SSL VPN server, or firewall. In some embodiments, a remote machine (e.g., remote machine 106) provides a remote authentication dial-in user service, and is referred to as a RADIUS server. In other embodiments, a remote machine may have the capacity to function as either an application server or as a master application server. In still other embodiments, a remote machine may be a blade server. In yet other embodiments, a remote machine may execute a virtual machine providing, to a user or client computer (e.g., client machine 102), access to a computing environment.

In one embodiment, any or all of remote machines 106a-016n may include an Active Directory. For example, remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 may comprise an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 may execute an application on behalf of a user of a local machine (e.g., any of local machines 102a-102n). In other embodiments, a remote machine may execute a virtual machine, which provides an execution session within which applications execute on behalf of a user of a local machine. In one or more of these embodiments, the execution session is a hosted desktop session. In other embodiments, the execution session provides access to a computing environment, which may comprise one or more of: an application, a plurality of applications, a desktop, or a desktop session. As used herein, a desktop or a desktop session refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

In some embodiments, a local machine (e.g., local machine 102) may communicate with a remote machine (e.g., any of remote machines 106a-106n). In one embodiment, the local machine 102 communicates directly with one of the remote machines 106a-106n in a server farm. In another embodiment, the local machine 102 may execute a program neighborhood application to communicate with a remote machine in the server farm. In still another embodiment, the remote machine may provide the functionality of a master node. In some embodiments, the local machine 102 can communicate with the remote machines 106a-106n in the server farm through a network 104. Over the network 104, the local machine 102 can, for example, request execution of various applications hosted by the remote machines 106a-106n in the server farm and can receive output of the results of the application execution for display. In some embodiments, only a master node can provide the functionality required to identify and provide address information associated with a remote machine hosting a requested application.

In one embodiment, any or all of remote machines 106a-106n may provide the functionality of a web server. For example, the remote machine 106a may receive requests from the local machine 102, may forward the requests to a second remote machine 106b and may respond to the request by the local machine 102 with a response to the request from the remote machine 106b. In still another embodiment, the remote machine 106a may acquire an enumeration of applications available to the local machine 102 and address information associated with a remote machine 106b hosting an application identified by the enumeration of applications. In yet another embodiment, the remote machine 106a may present the response to the request to the local machine 102 using a web interface. In one embodiment, the local machine 102 can communicate directly with the remote machine 106a to access the identified application. In another embodiment, the local machine 102 may receive output data, such as display data, generated by an execution of the identified application on the remote machine 106a.

In some embodiments, any or all of remote machines 106a-106n (or the server farm that includes the remote machines 106a-106n) may be running one or more applications, such as an application providing a thin-client computing or remote display presentation application. For example, in one embodiment, the remote machine 106a (or a server farm including remote machine 106a) may execute as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an Independent Computing Architecture (ICA) client, developed by Citrix Systems, Inc. of Fort Lauderdale, Fla. In still another embodiment, the remote machine 106a may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

Any or all of local machines 102a-102n may execute, operate or otherwise provide an application, which can be any type and/or form of software, program, or executable instructions. An application can be of any type and/or form of web browser, web-based client, client-server application, a thin-client computing client, an ActiveX control, or a Java applet, or any other type and/or form of executable instructions capable of executing on local machines 102a-102n. For example, in some embodiments, the application may be a server-based or a remote-based application executed on behalf of the local machine 102a on a remote machine 106a. In other embodiments, the remote machine 106a may display output to the local machine 102a using any thin-client protocol, presentation layer protocol, or remote-display protocol, such as the ICA protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application may include any type of software related to voice over Internet protocol (VoIP) communications, such as a soft IP telephone. In further embodiments, the application may include any application related to real-time data communications, such as applications for streaming video and/or audio.

Figure 1E:
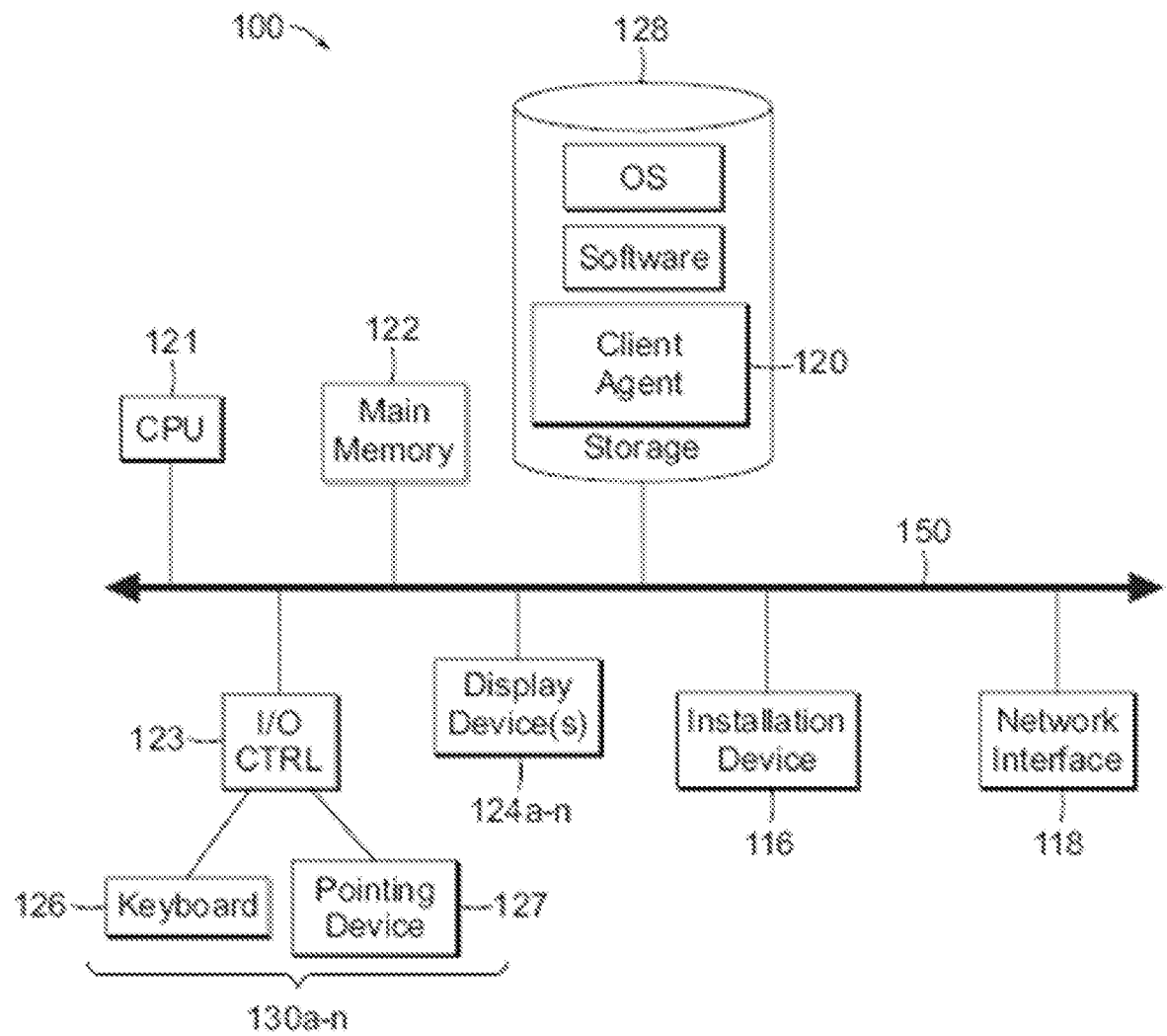
FIGS. 1E-1F are block diagrams depicting example embodiments of computing devices or computing device platforms useful in connection with implementing the methods and systems described herein
Figure 1F:
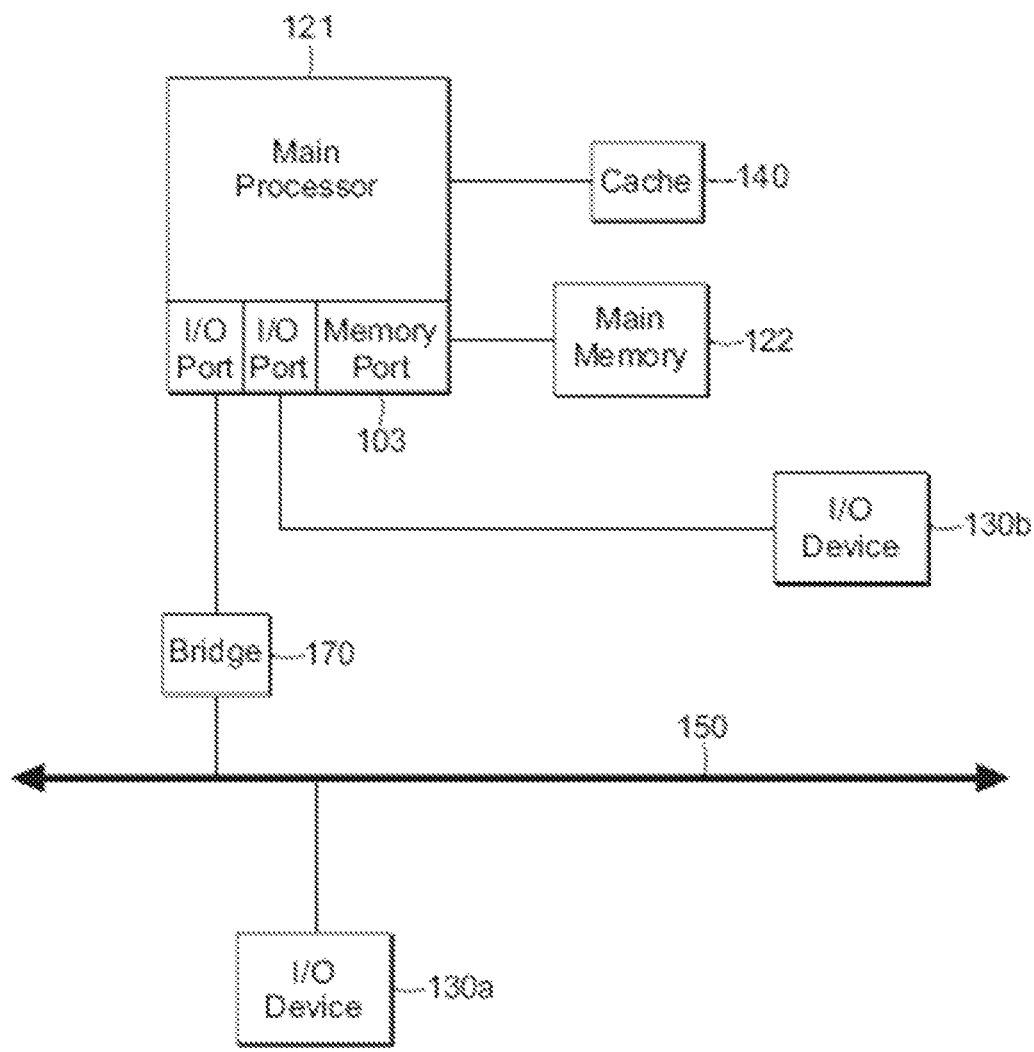

The local machines 102a-102n and remote machines 106a-106n may be deployed as and/or executed on any type and form of computing device, such as a computer, network device or appliance capable of communicating on any type and form of network and performing the operations described herein. FIGS. 1E and 1F depict block diagrams of a computing device 100 that can be used to implement an embodiment of the local machine 102, a remote machine 106, or other computer or machine discussed herein. Modifications may be made to the example computing device 100 shown in FIGS. 1E and 1F, such as by adding, removing, combining, dividing, etc., components as desired. As shown in FIGS. 1E and 1F, each computing device 100 includes a central processing unit 121, and a main memory unit 122. As shown in FIG. 1E, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1F, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 121 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 may have a faster response time than main memory 122 and may be provided using SRAM, BSRAM, or EDRAM. In the embodiment shown in FIG. 1E, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the input/output (I/O) device is a video display 124, the processor 121 may use an Advanced Graphics Port (AGP) to communicate with the display 124. FIG. 1F depicts an embodiment of a computer 100 in which the main processor 121 communicates directly with I/O device 130b via HYPERTRANSPORT, RAPIDIO, or INFINIBAND communications technology. FIG. 1F also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. An I/O controller 123, as shown in FIG. 1E, may control the I/O devices. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1E, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1E and 1F typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NIN- TENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 may be a TREO 180, 270, 600, 650, 680, 700p, 700w/wx, 750, 755p, 800w, Centro, or Pro smart phone manufactured by Palm, Inc. In some of these embodiments, the TREO smart phone may be operated under the control of the PalmOS operating system and includes a stylus input device as well as a five-way navigator device.

In other embodiments the computing device 100 may be a mobile device, such as a JAVA-enabled cellular telephone or personal digital assistant (PDA), such as the i55sr, i58sr, i85s, i88s, i90c, i95c1, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 may be a mobile device manufactured by Nokia of Finland, or by Sony Ericsson Mobile Communications AB of Lund, Sweden.

In still other embodiments, the computing device 100 may be a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 may be a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 may be a digital audio player. In one of these embodiments, the computing device 100 may be a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 may be a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 may be a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 may be a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 may be a Motorola RAZR or Motorola ROKR line of combination digital audio players and mobile phones. In another of these embodiments, the computing device 100 may be a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 2A:
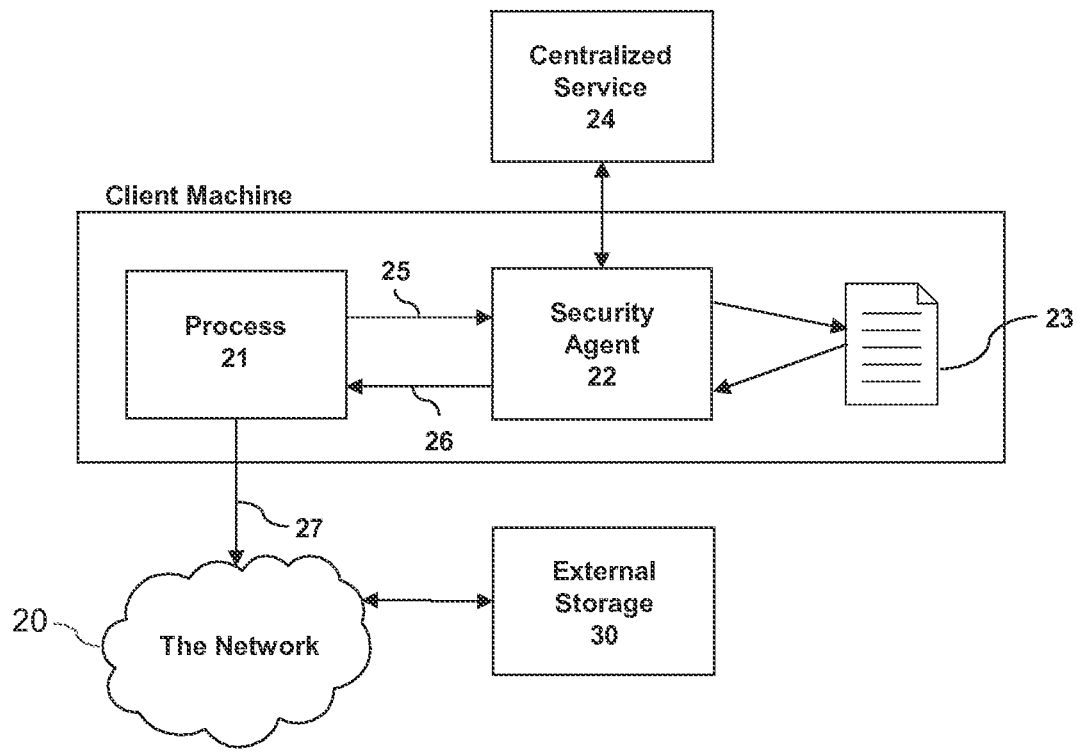
FIGS. 2A-2F are block diagrams depicting example embodiments for secure handling of data transmitted to external storage providers.

C. Providing Security to File Storage Programs and Providing Security to File Storage by an External Storage Provider Referring now to FIG. 2A, an example embodiment of a system for secure handling of data accessed by a process is depicted. In some embodiments, the client machine (e.g., client machine 10) may comprise one or more processes or programs (e.g., a process 21), one or more security agents (e.g., a security agent 22), and one or more data files (e.g., a data file 23). In some arrangements, process 21 may send messages identifying particular files. For example, the process 21 may initiate a request (e.g., depicted as line 25) to access a data file 23. The request 25 may include an identifier of the data file 23. The security agent 22 may intercept the request and may encrypt data file 23. The security agent may then provide (e.g., depicted via line 26) the encrypted data file to process 21. After receiving the encrypted data file, process 21 may transmit (depicted as line 27) the encrypted file for transmission to an external storage provider (e.g., transmit the encrypted file via a network 20 to external storage 30).

The data file 23 may be any data file capable of being stored on a computing system. Data file 23 may be a text document, a compilation of data, a spreadsheet, an image, a movie file, a log file, or any other type of computer file. In one embodiment, data file 23 is unencrypted. In some embodiments, data file 23 may be an encrypted file. In some arrangements where data file 23 is an encrypted file, security agent 22 may be encrypting data file 23 for a second time (e.g., adding a second layer of encryption to data file 23).

In some embodiments, data file 23 may be a collection of files. Data file 23 may be a representation of a directory which includes multiple files. Data file 23 may be an archive file that includes a plurality of files, such as a .zip archive file.

Data file 23 need not be stored on the client machine, but may be stored in any location accessible to the client machine. In some embodiments, data file 23 may be stored at a network location, an external hard drive, a CD-ROM, a floppy drive, a USB flash drive, or a Bluetooth accessible device. In some variations, data file 23 may be stored on a mobile device, such as a smart phone, that may be Internet connected.

In one embodiment, the security agent 22 may be an independent application program running on the client machine, a sub-process of a larger application, or other collection of executable code (e.g., a script). The security agent may be in communication with a number of other components such as centralized service 24 (discussed in greater detail below), or a number of other databases, key stores, network monitoring equipment, or authentication servers.

In one embodiment, process 21 may run on the client machine. In some embodiments, security agent 22 may not run on the client machine but may run on a different machine connected to the client machine over a network (e.g., security agent 22 may be remotely hosted on the different machine on behalf of the client machine).

In some embodiments, the security agent may operate as a listener process that awaits detection of a request for a file by process 21. The security agent may then trigger additional processes or sub processes whether located on the client machine or elsewhere on the network to accomplish the functions of the security agent, including encryption.

In some embodiments; the security agent may determine whether a particular program, process, application or user is "trusted" or "untrusted". That is, whether said program, process, application or user is allowed encryption-only access. A trusted process may be allowed full access to a file without encryption. An untrusted process may be allowed encryption-only access to a file. Untrusted processes may also refer to other types of processes, such as, for example, "black-list" processes that are not allowed access to a file. In some variations, a local backup program be listed as one of the black-list processes and denied access to the file.

The process 21 may be any process attempting access to file 23. Process 21 may be an untrusted or trusted process. Process 21 may be a stand-alone application running on the client machine, or it may be a component or sub-process of a larger process. Process 21 may be a process provided by the external storage provider.

In one embodiment, Process 21 may be the client-side Dropbox application provided by Dropbox, Inc. of San Francisco, Calif. In some embodiments, process 21 may not be provided by the external storage provider. In other embodiments, Process 21 may be Outlook application provided by Microsoft Corporation of Redmond, Wash. In other embodiments, process 21 may be a client application provided by the "Box.net" service provided by Box.net, Inc. of Palo Alto, Calif.; the "Sugarsync" service provided by Sugarsync, Inc. of San Mateo, Calif.; the "Mozy" service provided by EMC Co. of Hopkinton, Mass.; the "Carbonite" service provided by Carbonite, Inc. of Boston, Mass.; the "ZumoDrive" service provided by Zecter, Inc. of Burlingame, Calif.; the "Sky-Drive" service provided by Microsoft Corp. of Redmond, Wash.; and the "MobileMe" service provided by Apple Inc. of Cupertino, Calif. In some embodiments, process 21 may be an application that is not provided by the external storage provider, but instead communicates with the external storage provider.

In one embodiment, process 21 may be a synchronization process which attempts to synchronize files accessible to the client machine with files stored on the external storage provider.

Figure 2B:
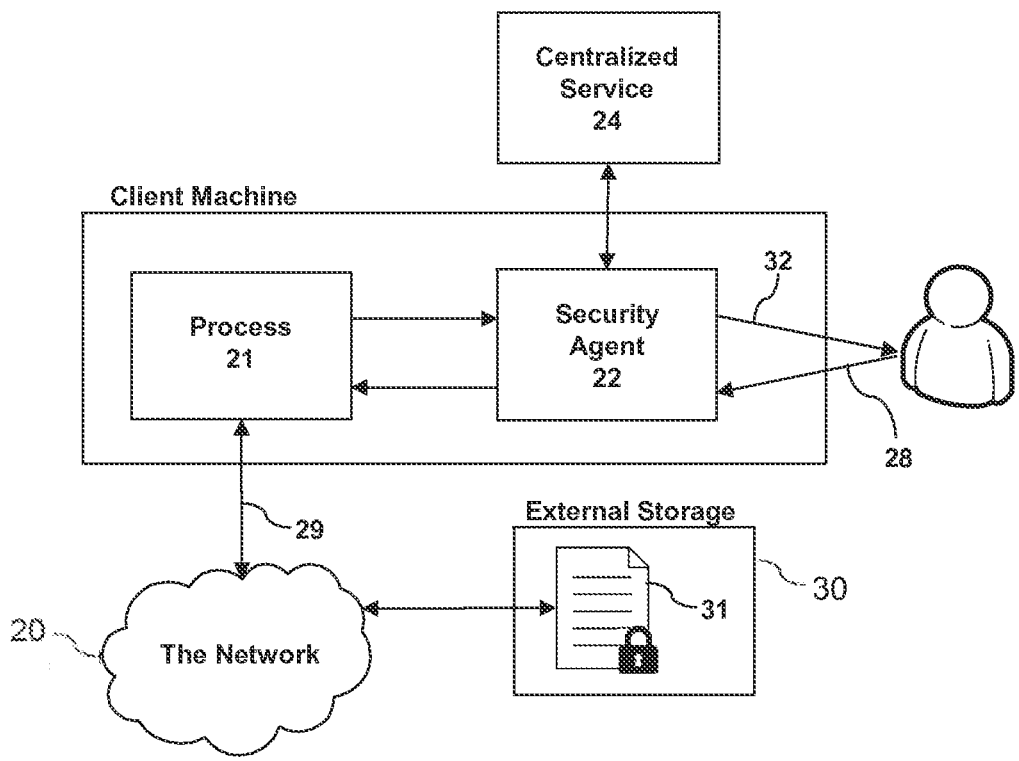

Referring now to FIG. 2B, an example embodiment for accessing secured data stored by an external storage provider is depicted. In some embodiments, a user may cause or otherwise initiate (e.g., depicted as line 28) a message to be sent to an external storage provider (e.g., addressed to the external storage provider 30), such as request for a data file 31 stored by an external storage provider (e.g., addressed to external storage facility 30 and identifying data file 31). In some arrangements, data file 31 may be encrypted (depicted in FIG. 2B by the lock). The message or request may proceed through security agent 22 and process 21. Process 21 may request data file 31 from the external storage provider 30 on behalf of the user (depicted as line 29) using network 20. Security agent 22 may intercept the request for data file 31. Security agent 22 may determine whether the user is authorized to access the file by consulting centralized service 24. If authorized, security agent may provide data file 31 to the user (depicted as line 32). In other arrangements, security agent 22 may decrypt file 31 prior to providing it to the user.

In some arrangements, security agent 22 may intercept the message upon being issued by process 21 (e.g., security agent 22 may intercept the message transmission at line 29 instead of line 28). In such arrangements, the user may be interacting with process 21 to cause the message to be transmitted to the external storage provider (and subsequently intercepted by security agent 22).

In one embodiment, the centralized process 24 may be a process accessible by the client machine running on a server or other machine in the network. In some embodiments the centralized service 24 may be a process running on the client machine. In other embodiments the centralized service 24 may be a combination of processes running on both the client machine and other machines on the network.

In some embodiments, the security agent 22 may make a determination as to whether an application, process, or machine is authorized to access a data file in consultation with centralized service 24.

Figure 2C:
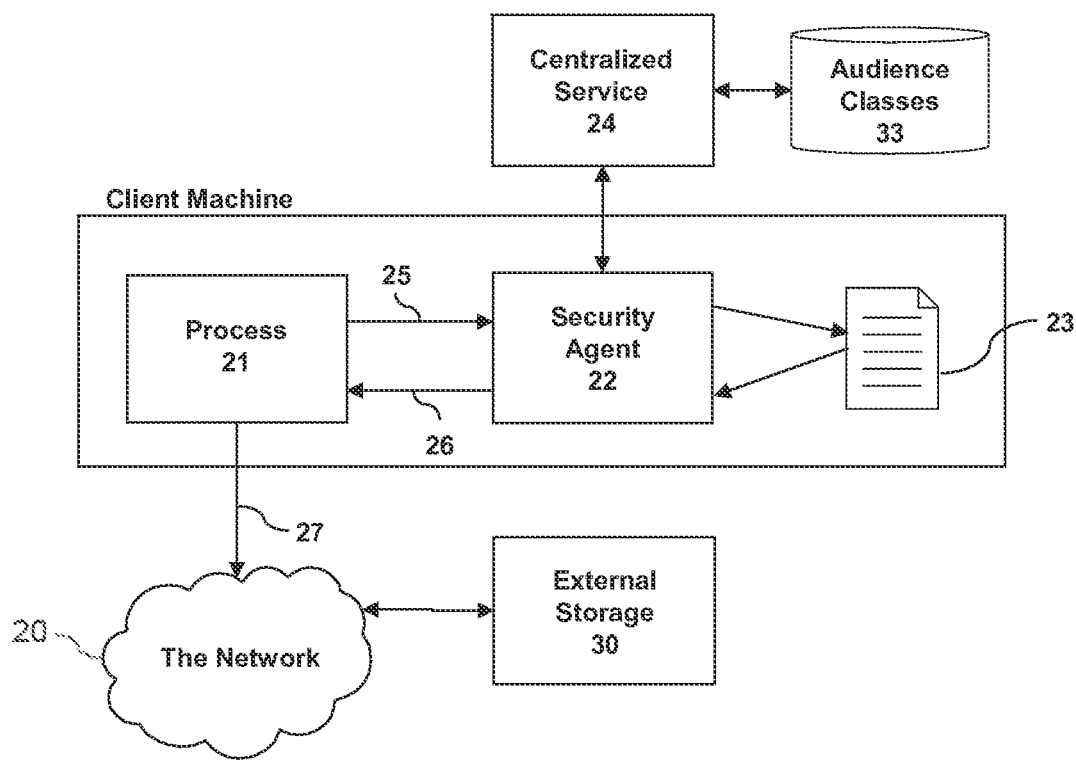

Referring now to FIG. 2C, an example embodiment of a system for secure handling of data accessed by a process is depicted. In brief overview, process 21 may transmit a message (depicted as line 25), such as a request to access data file 23. Security agent 22 may intercept the request. Security agent 22 may be in communication with a centralized service 24 and a storage location for audience classes 33. Security agent 22 may assign an audience class to data file 23 and may encrypt data file 23. Security agent 22 may provide the encrypted file to process 21 (depicted as line 26). Process may transmit (depicted as line 27) the encrypted file to the external storage provider 30 via the network 20.

An audience class may be any group of requestors allowed to access particular files. A requestor may include a user, a process, a program, a machine or computer, or the like. Audience classes may be mapped to the organizational structure of the entity running the enterprise network. Audience classes may also be broken down according to specific jobs or roles in the organization, groups, geographic location, or by any other metric. For example, some audiences may be categorized according to an arrangement, such as "Personal", "Executive Staff", "Company Wide", or "Public." Audience classes may also be groups of users maintained by separate software applications, such as those maintained by Microsoft Exchange Server provided by Microsoft, Inc. of Redmond, Wash. An audience class may be selected from a plurality of predetermined audience classes.

In some embodiments, security agent 22 may be in direct communication with the storage location for audience class store 33 (not shown).

Figure 2D:
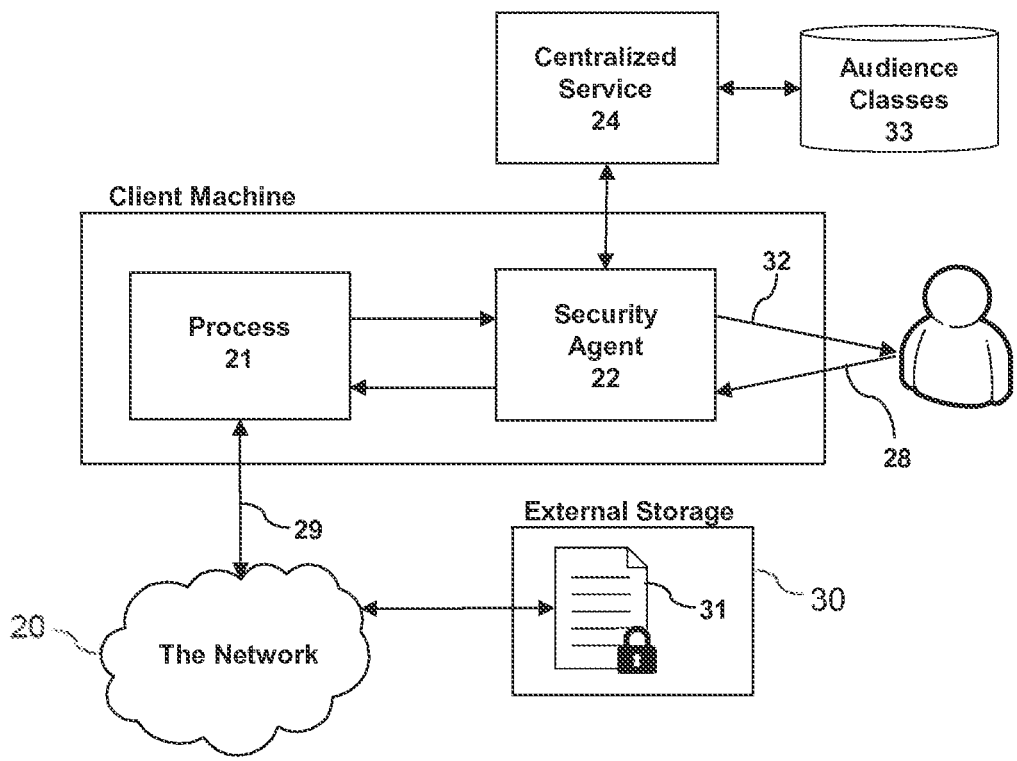

Referring now to FIG. 2D, an example embodiment for accessing secured data stored by an external storage provider is depicted. A user may transmit or otherwise initiate a message addressed to an external storage provider, such as a request for data file 31 (depicted at line 28). In some arrangements, data file 31 may be encrypted (as depicted by the lock in FIG. 2D). Security agent 22 may intercept the message and determine, in consultation with the centralized service 24 and audience classes 33 whether the user (or the process) belongs to the audience class assigned to the encrypted file. If the user (or the process) belongs to the assigned audience class, the file may be retrieved from the external storage provider and provided to the user (depicted at line 32). Retrieving from the external storage provider may include forwarding the message from security agent 22 to process 21 to cause process 21 to transmit the message to external storage provider 30 via network 20 (depicted at line 29). Security agent 22 may decrypt the data file prior to providing it to the user In some arrangements, security agent 22 may intercept the message upon being issued by process 21 (e.g., security agent 22 may intercept the message transmission at line 29 instead of line 28). In such arrangements, the user may be interacting with process 21 to cause the message to be transmitted to the external storage provider (and subsequently intercepted by security agent 22).

Figure 2E:
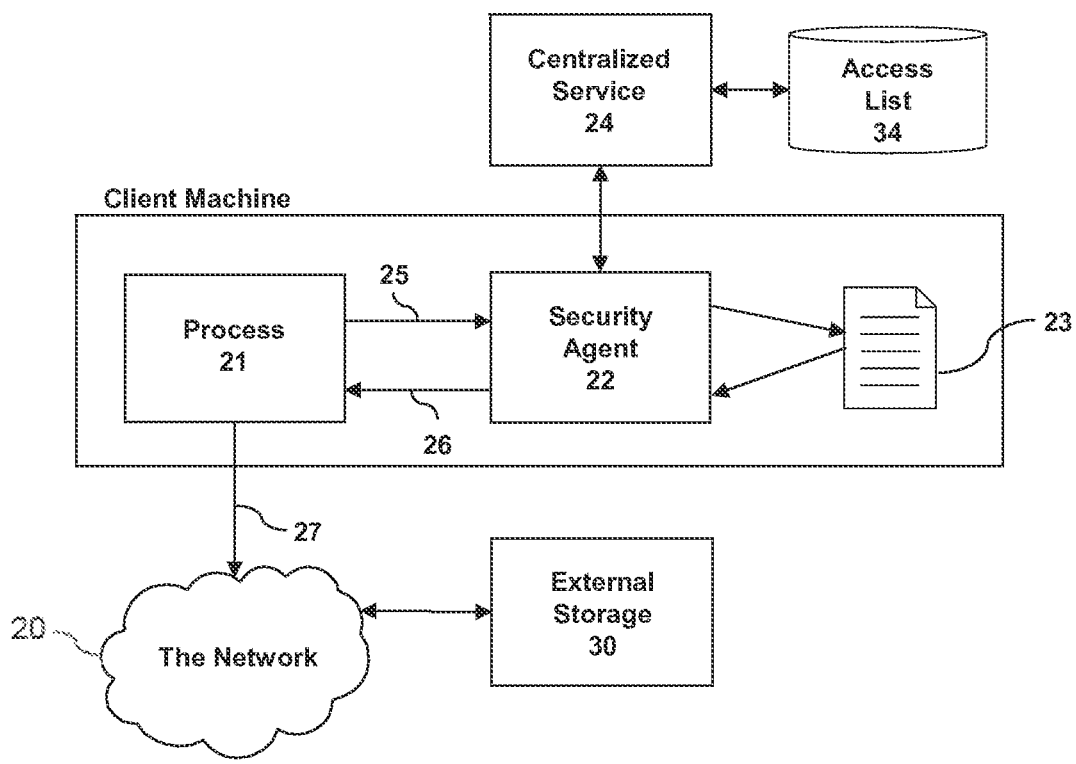

Referring now to FIG. 2E, an example embodiment of a system for secure handling of data accessed by a process is depicted. In some arrangements, security agent 22 may intercept a message, such as a request issued by a process 21 for data file 23 (depicted as line 25 in FIG. 2E). Security agent 22 may add an identifier for data file 23 to an access list 34. Security agent 22 may encrypt data file 23 and provide the encrypted file to process 21 (depicted as line 26). Process 21, upon receiving the encrypted file, may transmit the encrypted to the external storage provider 30 via network 20 (depicted as line 27).

In some embodiments, security agent 22 may be in direct communication with access list 34 (not shown).

Figure 2F:
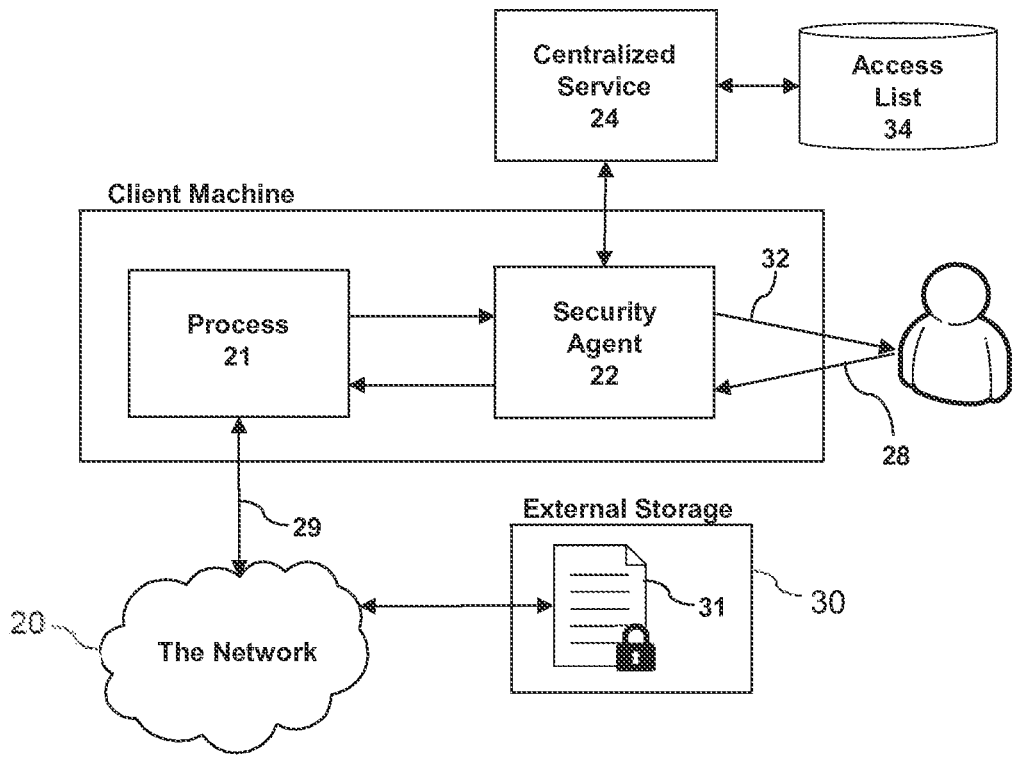

Referring now to FIG. 2F, an example embodiment for accessing secured data stored by an external storage provider is depicted. A user may cause transmission or otherwise initiate a message addressed to an external storage provider, such as a request for an data file 31 stored by an external storage 30. The security agent 22 may intercept the message (depicted at line 28) and determine by consulting access list 34 whether the user (or process) is authorized to access encrypted file 31 (e.g., by determining whether an identifier for the requested file is included in the access list). If the user (or process) is authorized, the security agent 22, the file may be retrieved from the external storage provider and provided to the user (depicted at line 32). Retrieving from the external storage provider may include forwarding the message from security agent 22 to process 21 to cause process 21 to transmit the message to external storage provider 30 via network 20 (depicted at line 29). Security agent 22 may decrypt the data file prior to providing it to the user In some arrangements, security agent 22 may intercept the message upon being issued by process 21 (e.g., security agent 22 may intercept the message transmission at line 29 instead of line 28). In such arrangements, the user may be interacting with process 21 to cause the message to be transmitted to the external storage provider (and subsequently intercepted by security agent 22).

Further details of the example embodiments depicted in FIGS. 1A-1F and FIGS. 2A-2F will be discussed in connection with the example methods depicted in FIGS. 3A-3D and 4A-4D, as well as the example graphical examples depicted in FIGS. 5A and 5B.

Figure 3A:
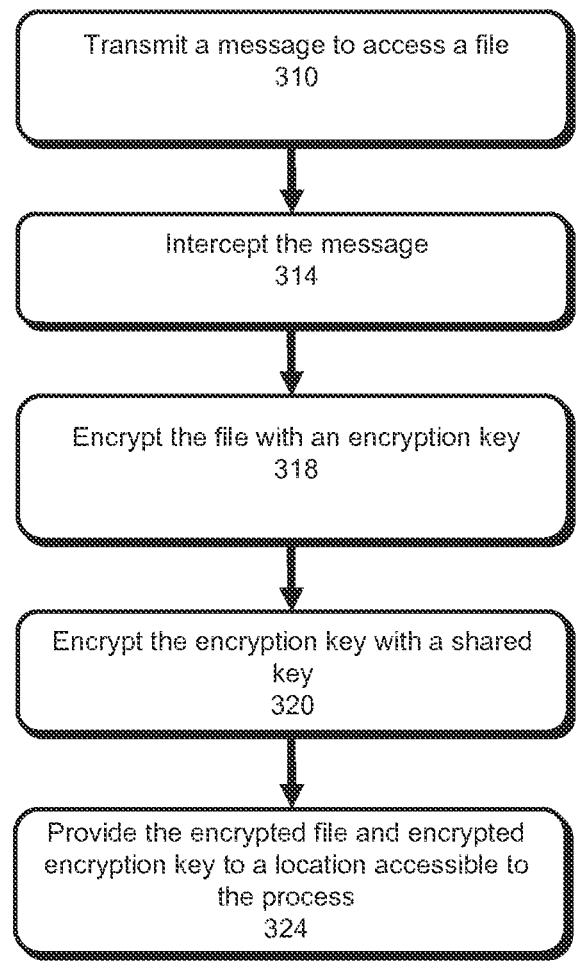
FIGS. 3A-3B are flow diagrams depicting example embodiments of methods for securing data before transmission by a process.

Referring now to FIG. 3A, an example method for secure handling of data accessed by a process is depicted. At step 310, a message may be transmitted to access a particular data file, such as a request by a process to access a file (e.g., process 21). In some arrangements, the process may be an untrusted process. At step 314, the message may be intercepted, such as by a security agent in communication with the process (e.g., security agent 22). At step 318, the data file identified by the message may be encrypted by the security agent using an encryption key. At step 320, the encryption key may be encrypted (e.g., by the security agent) with a shared key, resulting in an encrypted encryption key. In some arrangements, encrypting the encryption key may allow for control (e.g., by a centralized service or bilaterally between two security agents) over whether another security agent is permitted to decrypt the encryption key. In some variations, the shared key may be maintained by a centralized service. At step 324, the encrypted file and/or the encrypted first encryption key may be provided to a location accessible to the process (or otherwise transmitted to the process. Further details of these steps will now be discussed.

In some embodiments, a message to access a file may be made by a semi-trusted process. In other embodiments, a message to access a file may be made on behalf of a user, or on behalf of another process or application. The message may be a local request to the client machine, a request to a different machine on the enterprise network, or to a machine beyond the enterprise network. For example, the message could be a request made over or received from the Internet. In some embodiments, transmission of the message may be initiated according to a predetermined schedule or according to a synchronization protocol.

In some embodiments, the file identified by the message may reside on a local client machine. In other embodiments, the file may reside at any location accessible by the client machine. The file may be stored on a server in the enterprise network, or the file could be stored on a server external to the enterprise network. The file may be stored on a computing machine connected to the client machine over the internet. The file may be stored in "the cloud."

In some embodiments, the security agent may intercept the message by operating as a listener process that waits for a message to be transmitted. In some arrangements, the security agent may respond to a detected message. In some embodiments, the intercepting may be accomplished by routing all network traffic through an intermediary network appliance. The intercepting can occur at the client machine, on some other machine in the enterprise network, on a plurality of machines in the enterprise network, or on a plurality of machines connected over the Internet.

In some embodiments, the security agent may encrypt the file with an encryption key by generating a unique encryption key for the file being encrypted. In some embodiments the encryption key may be stored by a different computing device, such as by a centralized service (e.g., centralized service 24). In other embodiments, encryption keys may be stored on a machine in the enterprise network and made available to the security agent. The encryption of the file may occur at the client machine, on some other machine in the enterprise network, on a plurality of machines in the enterprise network, or on a plurality of machines connected over the Internet.

The security agent may consult a remotely located key store or key engine in order to generate a unique encryption key for the file. In some embodiments the encryption keys may be managed by a centralized service and relayed to the security agent as necessary. In some embodiments, the encryption keys may not be exposed to the security agent, and the security agent may use a centralized service to perform encryption/decryption.

In some embodiments, the security agent may encrypt the encryption key with a shared key by using a shared key available to all users of the enterprise network. In some embodiments, the shared key may be managed or maintained by a centralized service (e.g., centralized service 24). In some variations, the shared key may be managed bilaterally between two security agents. In some embodiments, the shared key may be a private key. In other embodiments, the shared key may be a public key. In some embodiments, the shared key may be a key known to a particular set of users or particular set of applications or processes. In some embodiments, the shared key may be generally known to trusted processes on the enterprise network. The encryption of the encryption key may occur at the client machine, on some other machine in the enterprise network, on a plurality of machines in the enterprise network, or on a plurality of machines connected over the Internet. The shared key may conform to various key management schemes, such as public key pairs, pre-shared keys, and the like.

In some embodiments, the encrypted file may be provided to the accessible location by sending the file from one process to another on the client machine. In other embodiments, providing the file to an accessible location may be accomplished by providing the file over the local enterprise network or over the Internet. Providing the file to an accessible location may also be accomplished by sending an identifier of a file or the file's location rather than the entire file to process that transmitted message identifying the file (e.g., process 21).

Figure 3B:
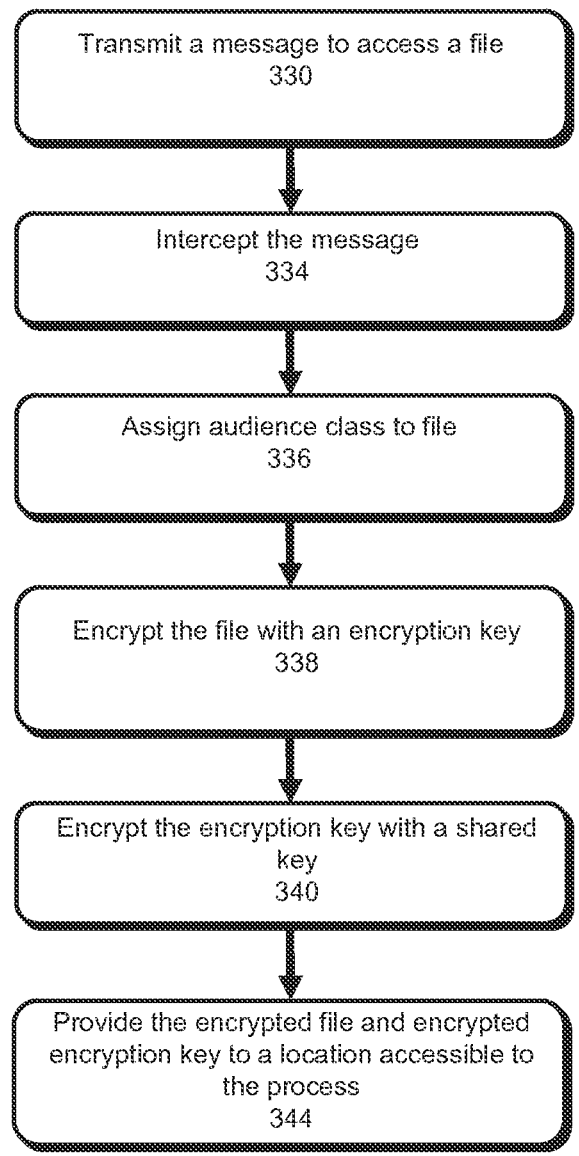

Referring now to FIG. 3B, an example method for secure handling of data accessed by a process is depicted. At step 330, a message to access a file may be transmitted by a process. In some arrangements, the process may be an untrusted process. At step 334, the message may be intercepted by a security agent (e.g., security agent 22). At step 336, an audience class may be assigned to the file by the security agent, such as by determining which audience class identifier to assign and storing data identifying the assignment. In some arrangements, the file may be tagged with an identifier of the assigned audience class. At step 338, the file may be encrypted by the security agent using an encryption key. At step 340, the encryption key may be encrypted by the security agent using a shared key. At step 344, the encrypted file and/or the encrypted encryption key may be provided to a location accessible to the process e.g., process 21) by the security agent. The encrypted file that is provided to the process may have been tagged with the associated audience class.

In one or more embodiments, the shared key may be a key generally available to trusted processes on the enterprise network and accessible to the security agent. In some embodiments, the shared key may be controlled by centralized service 24 and may be provided to security agent 22 by the centralized service 24 upon confirmation by the centralized service that the user is authorized to access the file.

Figure 3C:
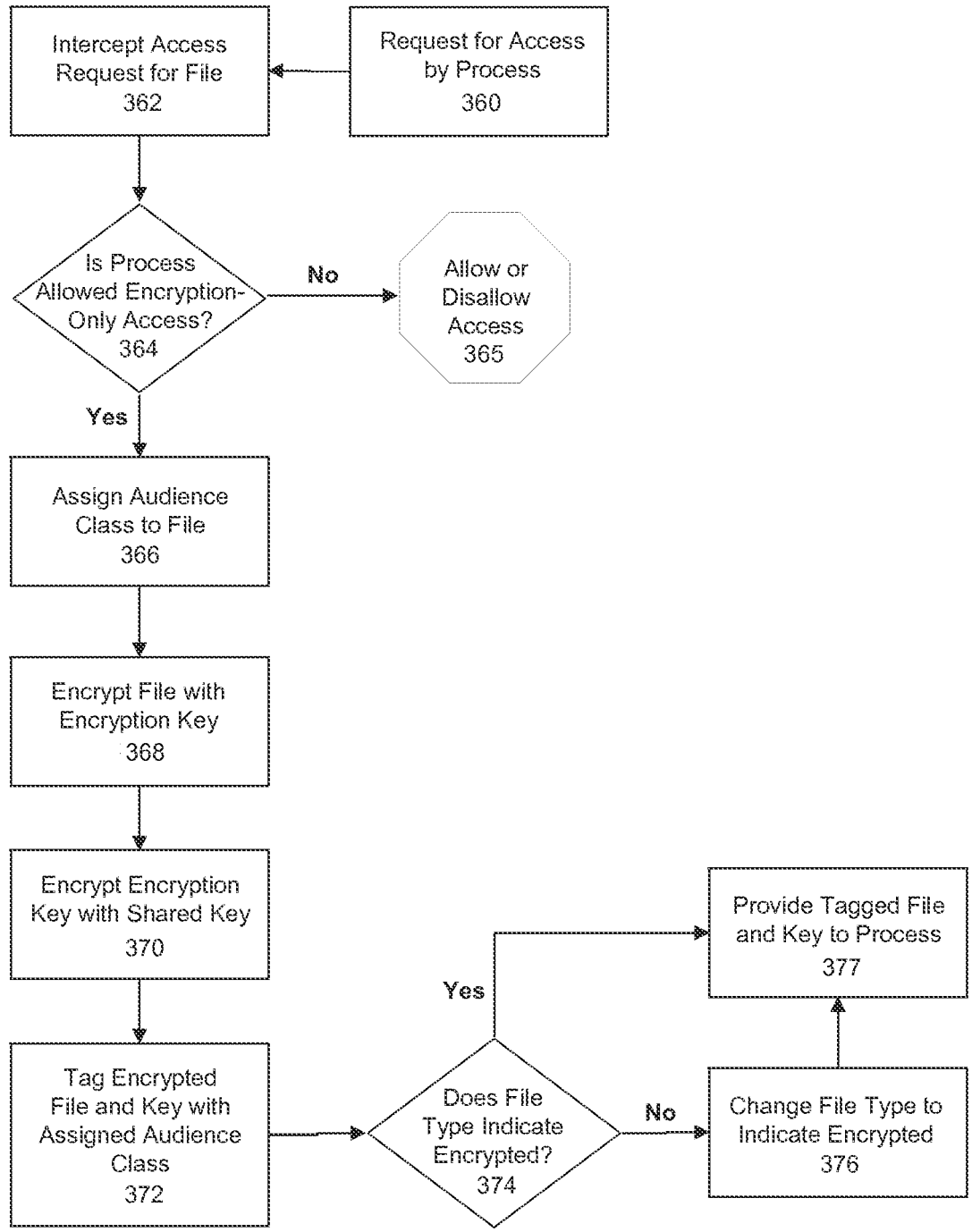
FIGS. 3C-3D are flow charts depicting example embodiments of methods for securing data before transmission by a process.

Referring now to FIG. 3C, an example method for secure handling of data accessed by a process is depicted. At step 360, a message or request to access a file may be transmitted by a process (e.g., process 21). At step 362, the request may be intercepted by a security agent (e.g., security agent 22). At step 364, a determination may be made whether the process is allowed encryption-only access to the file. If the process is not allowed encryption-only access (e.g., the process has different access rights to the file, or can access the file as it is accessible by the client machine), then the security agent may, at step 365, allow or deny access to the file based on the access rights (e.g., greater than encryption-only access rights—such as full access—may cause allowance, while less than encryption-only access rights—such as no access rights—may cause denial). If the process is allowed encryption-only access, the method may proceed to step 366, where the security agent may assign an audience class to the file. At step 368, the file may be encrypted with an encryption key. At step 370, the encryption key may be encrypted by the security agent with a shared key. At step 372, the security agent may tag the encrypted file and the encrypted encryption key with the assigned audience class. At step 374, the security agent may determine whether the current file type of the encrypted file indicates that the file is an encrypted file. If the file type does not indicate that the file is encrypted, the security agent may, at step 376, change the file type to one that is indicative that the file is encrypted. Once or if the file type is indicative that the file is encrypted, the security agent, at step 377, may provide the tagged and encrypted file and encrypted encryption key to the process, such as by providing the encrypted file and the encrypted encryption key to a location accessible to the process.

In some embodiments, a determination that the process is not allowed encryption-only access, may result in the security agent disallowing access to the file.

In some embodiments, the security agent may change the file type by changing the file extension on the file to one that is indicative that the file is encrypted.

Figure 3D:
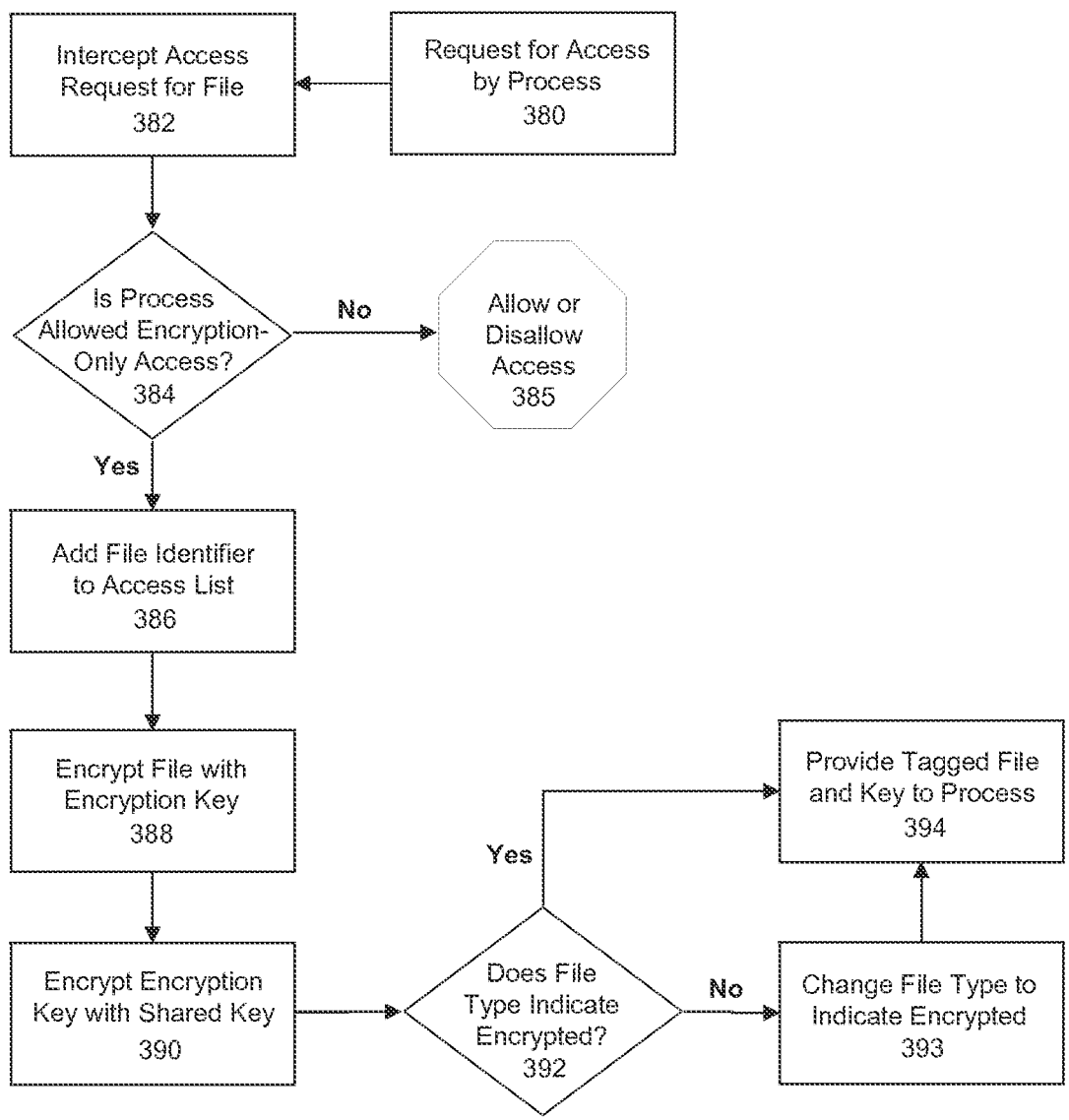

Referring now to FIG. 3D, an example method for secure handling of data accessed by an untrusted process is depicted. At step 380, a message or request to access a file may be transmitted by a process (e.g., process 21). At step 382, the request may be intercepted by a security agent (e.g., security agent 22). At step 384, a determination is made as to whether the process is allowed encryption-only access (315). If the process is not allowed encryption-only access (e.g., the process has different access rights to the file, or the process can access the file as it is accessible by the client machine), then, at step 385, the security agent may allow or deny access to the file based on the access rights. If the process is allowed encryption-only access, the method proceeds to step 386, where the security agent may add an identifier for the file to an access list. At step 388, the file may be encrypted by the security agent with an encryption key. At step 390, the encryption key may be encrypted with a shared key. At step 392, The security agent may determine whether the current file type of encrypted file indicates that the file is an encrypted file. If the file type does not indicate that the file is encrypted, the security agent may, at step 393, change the file type to one that is indicative that the file is encrypted. Once or if the file type is indicative that the file is encrypted, the security agent may, at step 394, provide the encrypted file and encrypted encryption key to the process, such as by placing the encrypted file and encrypted encryption key in a location accessible to the process.

Figure 4A:
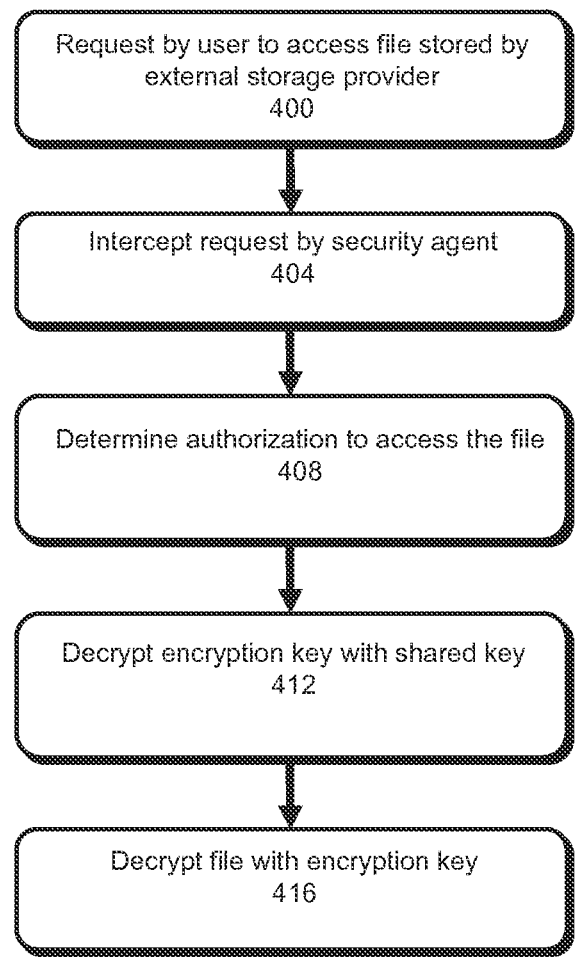
FIG. 4A-4B are flow diagrams depicting example embodiments of methods for retrieving secured data from external storage providers.

Referring now to FIG. 4A, an example method for accessing secured data stored by an external storage provider is depicted. At step 400, a message or request is made or otherwise initiated by a user via a process (e.g., process 21) to access a file (e.g., encrypted file 31) stored by an external storage provider. At step 404, the request may be intercepted by a security agent. At step 408, the security agent may determine the authorization to access the file, such as whether the user (or the process) is authorized to access the file. At step 412, the security agent may decrypt the encrypted encryption key that is stored with the requested file using a shared key. At step 416, the security agent may decrypt the file with the encryption key that was recovered at step 416. Further details of these steps will be discussed below.

In some embodiments, a message or request to access the file that is initiated by a user via process may be transmitted by an application or process on behalf of user and this transmission may be intercepted by the security agent. In other embodiments, the request may be made by a process or application without a request from a user, such as according to a predetermined schedule or synchronization protocol. Additionally, the request may originate from the client machine, the enterprise network, or the Internet. Further, the request may be addressed to the external storage provider and may identify the file the user or process desires to access.

In some embodiments, the security agent may intercept the access request by, for example, operating as a listener process that waits for a request being made. In some variations, the security agent may respond to a request. In some embodiments the intercepting may be accomplished by routing all network traffic through an intermediary network appliance. The intercepting can occur at the client machine, on some other machine in the enterprise network, on a plurality of machines in the enterprise network, or on a plurality of machines connected over the Internet.

In some embodiments, the security agent may determine whether there is authorization to access the file by, for example, consulting a centralized service. In some embodiments, determining authorization may include determining whether a particular application or process is authorized to access the file. In some embodiments, determining authorization may include consulting with an audience class database which provides groups of users with differing levels of access to files. In some embodiments, determining authorization may include consulting an access list which associates users or groups of users with varying access levels to files. In some variations, determining authorization may be accomplished with or without consulting a centralized service. In some embodiments, determining authorization may be accomplished by a security agent which is in direct communication with an audience class database and/or an access list. In other embodiments, a security agent may have the resources available locally to determine the authorization to access the file, such as the resources needed to determine whether a particular user, application, or process has authorization to access a particular file.

In some embodiments, the security agent may decrypt the encrypted encryption key that is stored with the file using a shared key by, for example, conducting the decryption on the client machine. In other embodiments, decrypting the encrypted encryption key may be accomplished by sending the encrypted encryption key over the enterprise network or over the Internet to a different machine that can perform the decryption with the shared key. In some embodiment, the shared key may be a private key. In some embodiments, the shared key may be a public key. In some embodiments the shared key may be managed by a centralized service (e.g., centralized service 24). In other embodiments the security agent may communicate with a centralized service or other process, database, or resource, to determine which key, from a plurality of available keys, to use in accomplishing the decryption of the encrypted encryption key.

In some embodiments, the security agent may decrypt the file with the encryption key by, for example, conducting the decryption at the client machine. In some embodiments, decrypting the file may be accomplished by transmitting the decrypted file over the enterprise network or Internet to another machine that performs the decryption. The encryption key used to decrypt the file may be the encryption key recovered at step 408, and it may be a unique key generated for the encrypted file. While the encryption key may be stored along with the file, the encryption key may alternatively be managed by a centralized service or stored in a key store which may be in direct communication with security agent or in communication with security agent via centralized service. The security agent may receive the encryption key from the centralized service or key store responsive to a request for a key assigned to the encrypted file.

Figure 4B:
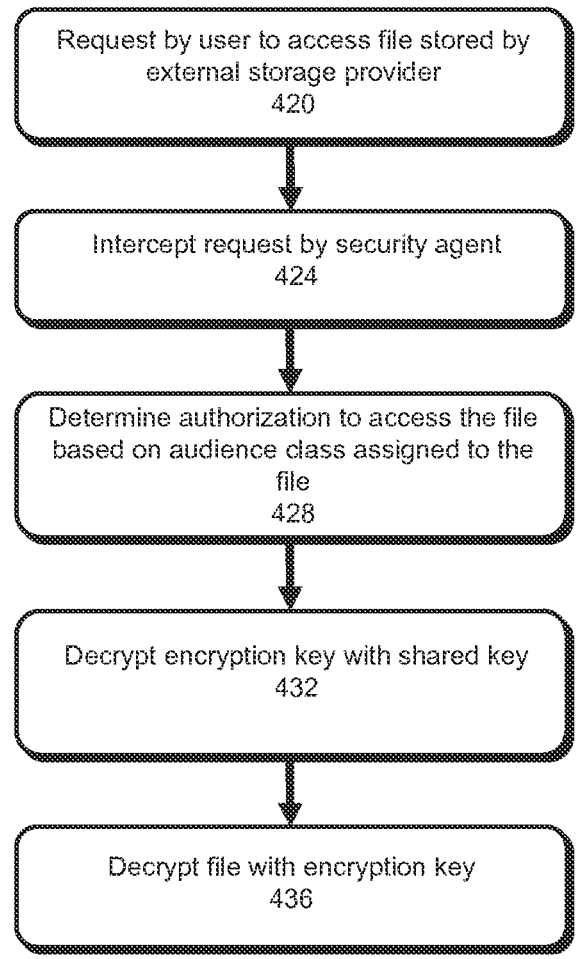

Referring now to FIG. 4B, an example method for accessing secured data stored by an external storage provider is depicted. At step 420, a request maymade by a user via a process (e.g., process 21) to access the encrypted file (e.g., encrypted file 31), which may be stored by an external storage provider. At step 424, a security agent (security agent 22) may intercept the access request for the encrypted file. At step, 428, the security agent may determine authorization to access the file based on the audience class assigned to the file. If the user (or process) is within the audience class, the security agent may determine that there is authorization to access the file, and the method may proceed to step 432. Otherwise, the method may end. At step 432, the security agent may decrypt the encrypted encryption key that is stored with the file. The decryption of the encrypted encryption key may be performed using a shared key. At step 436, the security agent may decrypt the file with the encryption key.

Figure 4C:
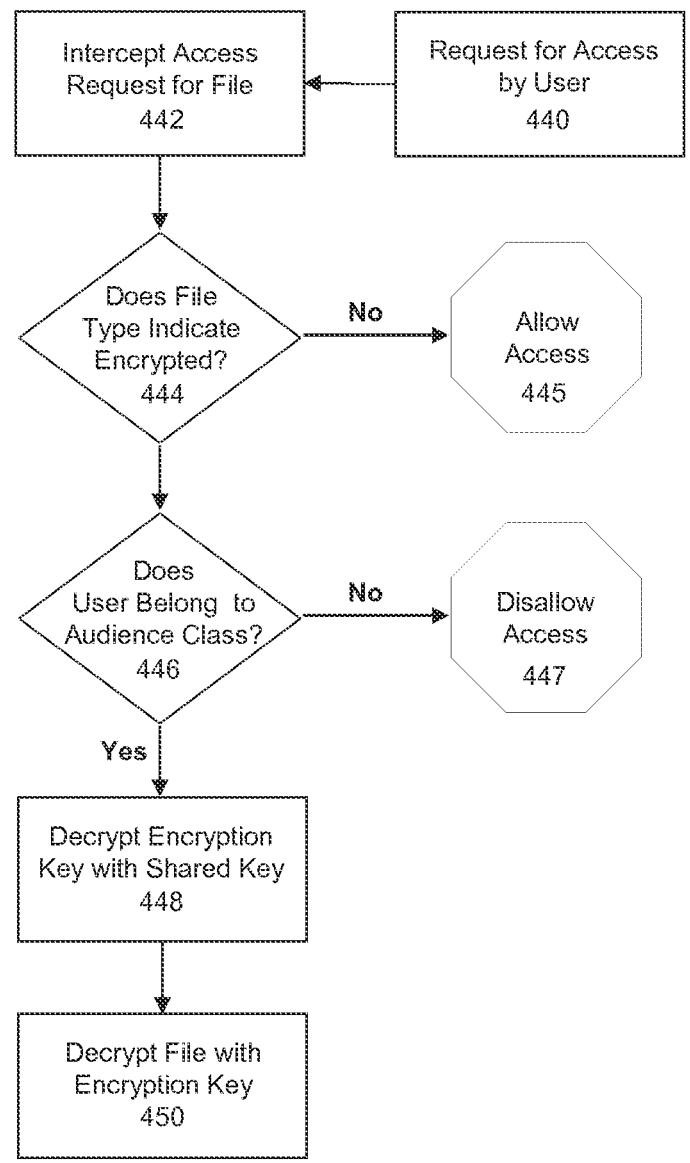
FIG. 4C-4D are flow charts depicting example embodiments of methods for retrieving secured data from external storage providers.

Referring now to FIG. 4C, an example method for accessing secured data stored by an external storage provider is depicted. At step 440, a request may be made by a user via a process to access a file stored by an external storage provider. At step 442, a security agent may intercept the access request for the file that was made by the user (or transmitted by the process in response to user interaction). At step 44, the security agent may determine whether the file type of the requested file indicates that the file is encrypted. If the file type does not indicate that the file is encrypted, the security agent may allow access by the user to the file at step 445. However, if the file type indicates that the file is encrypted, a determination is made, at step 446, as to whether the user (or process) belongs to the audience class assigned to the file. If the user (or process) does not belong to the audience class assigned to the file, access by the user is disallowed at step 447. Howevrer, if the user does belong to the audience class assigned to the file, the security agent may decrypt the encrypted encryption key with a shared key at step 448. At step 450, the security agent may decrypt the encrypted file with the encryption key recovered by step 448.

In some embodiments, it may be possible to change the membership of a particular audience class assigned to a file, user or process in between transmitting a file to the external storage provider and subsequently retrieving the file. Because of a change in audience class membership, it may be possible that a user or process that caused the file to be transmitted to the external storage provider may be unable to access the file at a later period in time (e.g., because the user or process may have been removed as a member of the audience class allowed to access the file).

Figure 4D:
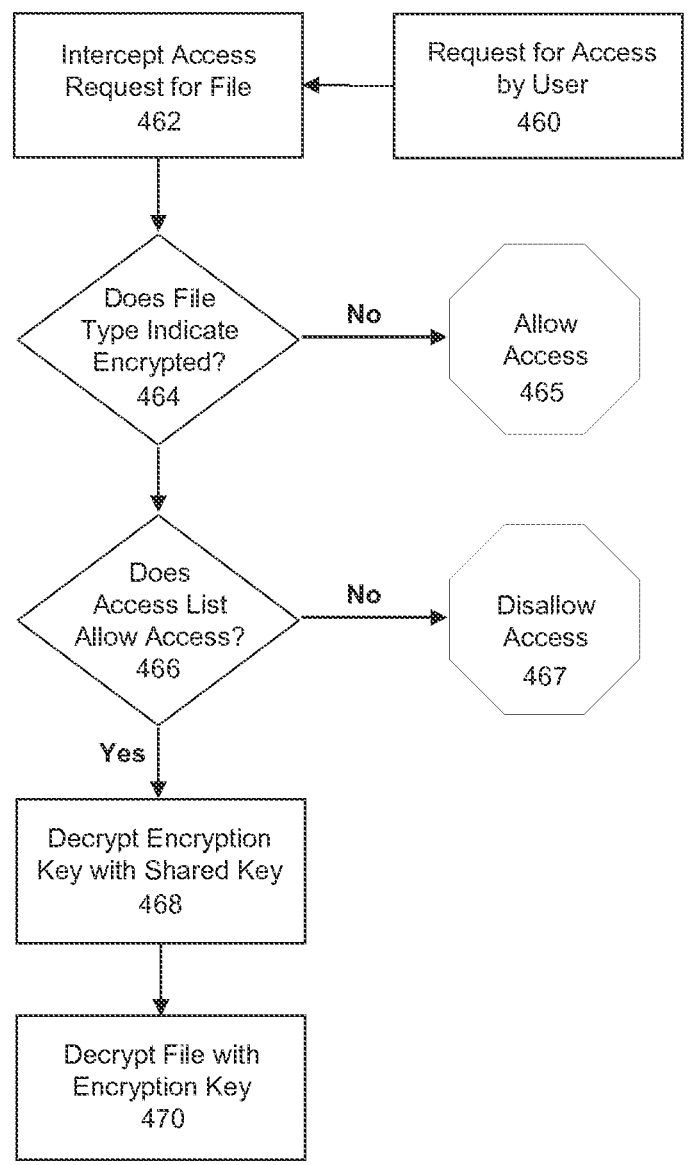

Referring now to FIG. 4D, an example method for accessing secured data stored by an external storage provider is depicted. At step 460, a request may be made by a user via a process to access a file stored by an external storage provider. At step 462, a security agent may intercept the access request for the file. At step 464, the security agent may determine whether the file type of the requested file indicates that the file is encrypted. If the file type does not indicate that the file is encrypted, the security agent may allow access by the user to the file at step 465. However, if the file type indicates that the file is encrypted, a determination may be made at step 466 as to whether a user is authorized to access a file by consulting an access list. If the user is not authorized to access the file, access by the user is disallowed at step 467. However, if the user is authorized to access the file, the security agent may proceed to step 468, where the encrypted encryption key may be decrypted with a shared key. At step 470, the security agent may decrypt the encrypted file with the encryption key recovered by step 468.

In some embodiments, the access list may be indexed according to an identifier for the file, with a list of users (or processes) or groups of users (or groups of processes) associated with that file who are allowed access. The access list may further include a list of users or group of users that are explicitly denied access to a file. The authorization to access the file may then be determined, for example, by searching for an identifier for the file and checking whether the user or process is allowed or denied access.

In some embodiments, it may be possible to change the access list in between transmitting a file to the external storage provider and subsequently retrieving the file. Because of this change, it may then be possible that a user (or process) that transmitted a file to the external storage provider may be unable to access the file at a later period in time (e.g., because the user or process may have been removed from the list of allowed users associated with a particular file identifier on access list, or added to the list of denied users/processes).

Figure 5A:
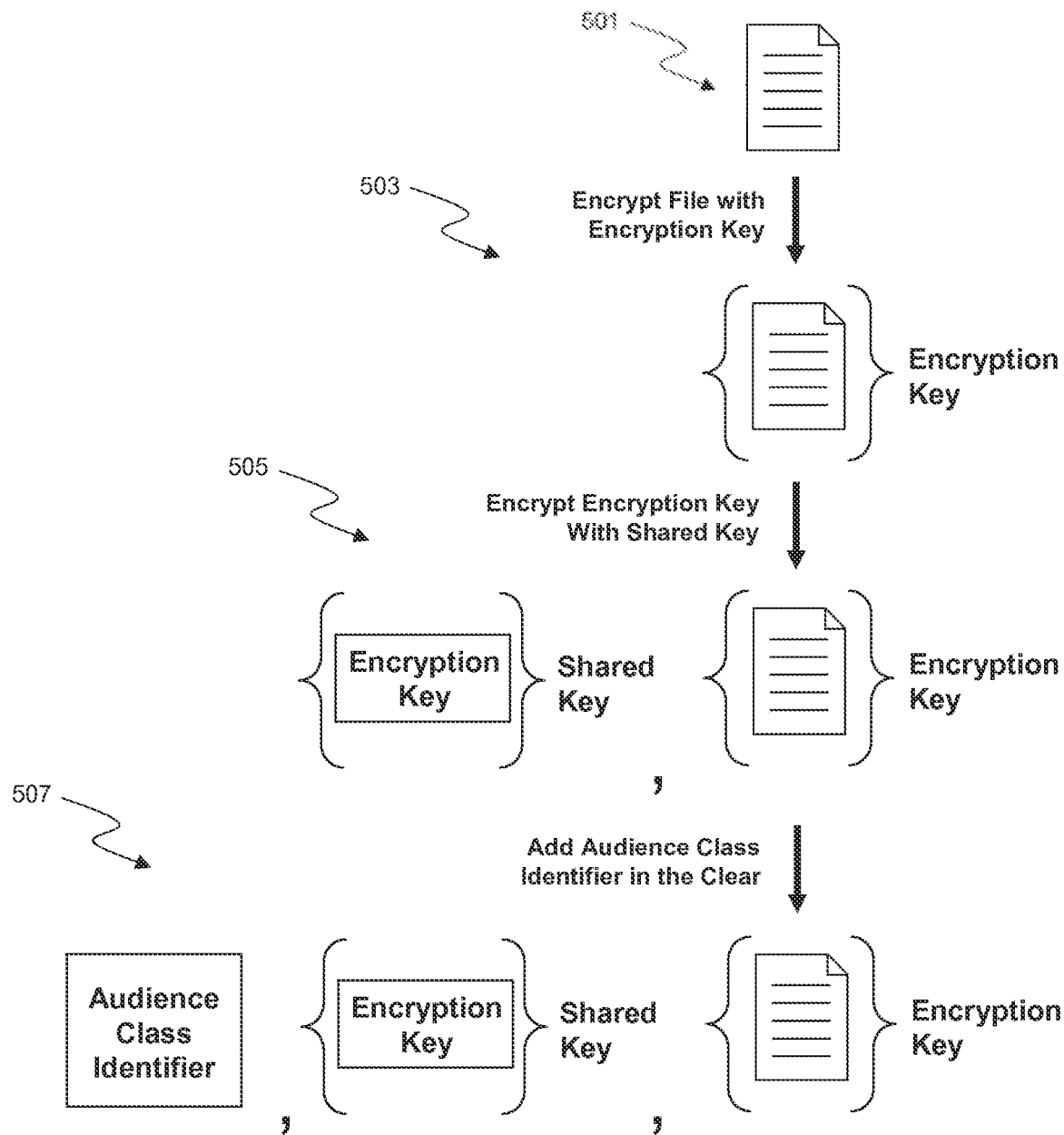
FIG. 5A is a flow diagram depicting a graphical example of an encryption process.

Referring now to FIG. 5A, a graphical example of an encryption process is depicted. The encryption process begins with a data file, as depicted at 501. The data file may be encrypted with an encryption key, as depicted at 503. In some embodiments, the encryption key may be a uniquely generated key for data file. At depicted at 505, the encryption key may then be encrypted with a shared key and grouped with (or otherwise assigned to) the encrypted file encrypted. Additionally, as depicted at 507, an audience class identifier associated with the data file may be grouped together (or otherwise "tagged" or associated) with the grouped encrypted encryption key and encrypted file. The audience class identifier may be grouped with the encrypted encryption key and the encrypted file in an unencrypted form (e.g., in the clear), or the audience class identifier may be in a hashed form. The hashed form may be capable of being interpreted by the security agent.

In some embodiments, the data file may itself be an encrypted file and the encryption depicted at 503 may add a second layer of encryption.

In some embodiments, tagging a file with the audience class identifier may be accomplished by, for example, adding the audience class identifier to the encrypted file's metadata.

Figure 5B:
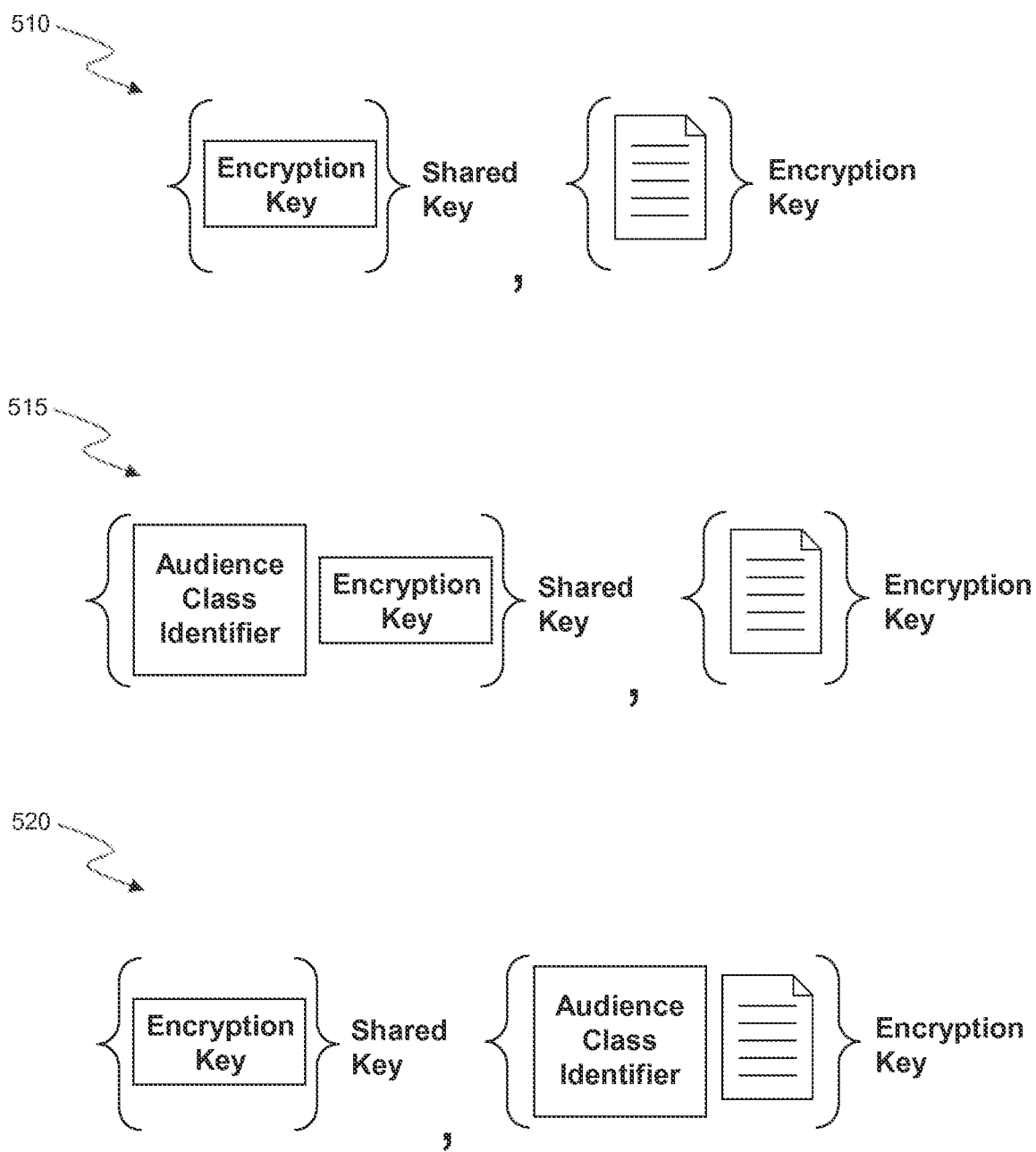
FIG. 5B is a diagram depicting various graphical examples of encrypted data.

Referring now to FIG. 5B, various graphical examples of encrypted data, such as files and keys, are depicted. The various machines and/or processes discussed in this disclosure may utilize the depicted examples of encrypted data. As depicted at 510, an encrypted file may, in some embodiments, not include an audience class identifier. Instead, the encrypted file may consist only of the encrypted file and encrypted encryption key. As depicted at 515, the audience class identifier may have been encrypted with a shared key along with the encryption key, forming an encrypted listing of the audience class identifier and the encryption key. As depicted at 520, the audience class identifier may have been encrypted along with the file. A person of ordinary skill in the art would understand that the systems and methods disclosed could use any one of these encryption schemes, as well as any combination thereof. Furthermore, many other plausible encryption schemes known in the art are contemplated by the present disclosure for use with the invention.

Figure 6A:
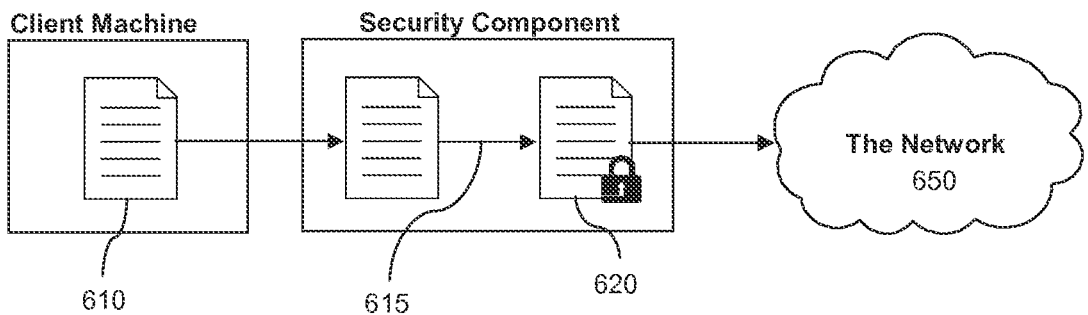
FIG. 6A-6B are flow diagrams depicting example embodiments of encryption and decryption processes.

In addition to the above example embodiments of systems and methods for providing security to file storage programs and providing security to file storage by an external storage provider, FIGS. 6A-6C, 7, 8A-8D and 9A-9B provide additional examples. One or more aspects of the below examples may be combined with various aspects of the above described example embodiments. Referring now to FIG. 6A, a graphical example of an encryption process is depicted. In brief overview, a data file 601 may be accessible by a client machine. An attempt to transmit the data file 601 through a network 650 to the machines of an external storage provider is made (not shown). In some arrangements, the attempt to transmit may include transmitting data file 601 in one or more packets addressed to the external storage provider (or a machine of the external storage provider). A security component may detect or intercept the transmission and may encrypt the data file 610 (encryption process shown via line 615) into an encrypted file 620. The security component may then transmit the encrypted file to the external storage provider via the network 650.

In one embodiment, the security component may run on an intermediary (e.g., machine 18), which may be located at the edge of the enterprise network. In other embodiments, the security component may run on a client machine or any other machines on the enterprise network. The security component may also run as a combination of processes on a number of servers, machines, intermediaries, and clients.

In some embodiments, the encryption performed by the security component may be considered "on-the-fly" encryption or "real-time" encryption in that a file may be immediately decrypted after encryption. In some embodiments, on-the-fly encryption may be implemented through use of the "TrueCrypt" open source program or other suitable on-the-fly encryption program.

Figure 6B:
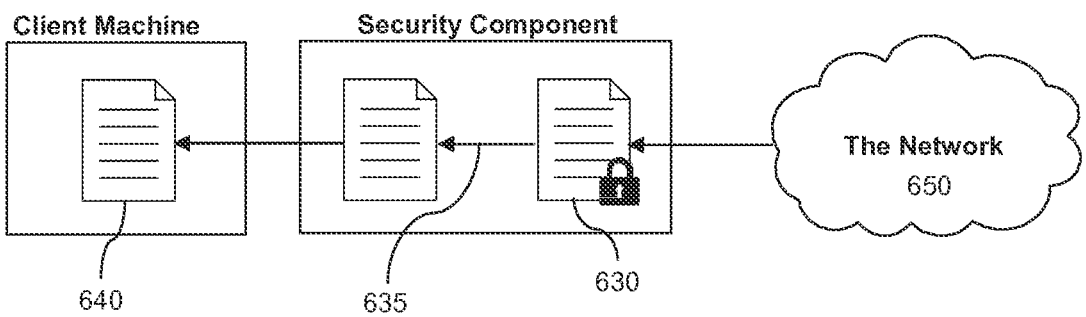

Referring now to FIG. 6B, a graphical example of a decryption process is depicted. A request may be made to access an encrypted file stored by an external storage provider across a network (not shown). In response to the request, the encrypted file 630 may be transmitted from the external storage provider and addressed to a client machine. A security component may intercept the encrypted data file 630 and may decrypt the encrypted file 630 into unencrypted data file 640 (the decryption process is depicted at 635). After decrypting the file, the security component may transmit the unencrypted data file 640 to the client machine that made the original request for the file or the client machine the intercepted transmission was addressed to.

In some embodiments, the security component may determine whether a particular user attempting to access the file is authorized to access the encrypted file. The security component may also determine whether a particular application, process or client machine is authorized to access the encrypted file.

In one or more embodiments, the security component may assign a location for mounting a virtual disk volume comprising a copy or representation of the stored encrypted file. The virtual disk volume may be provided by the security component or the external storage provider. The virtual disk volume may be a network directory linked to the location of stored files at the external storage provider. The virtual disk volume may be an application or process that provides access to the external storage provider's storage location.

In some embodiments, a representation of the encrypted file stored by the external storage provider on the virtual disk volume may be a link, icon, screenshot, image, virtual copy, or any other representation or identifier which enables access to the encrypted file stored by the external storage provider. A representation may also be an abridged preview copy of the entire encrypted file. A representation may also be a directory, directory identifier, or part of a directory.

In some embodiments, a copy of the encrypted file stored at the virtual disk volume may be a local copy made and maintained by the security component. A local copy on the virtual disk drive may also be made and maintained by the external storage provider. It may be desirable to maintain local copied on the virtual disk volume for the purposes of synchronization, particularly where the external storage provider is being used as a backup service provider.

Figure 6C:
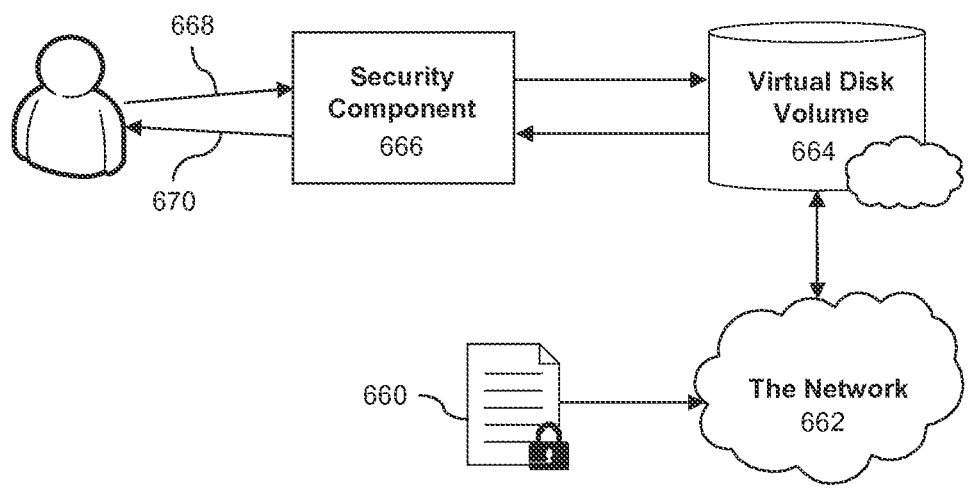
FIG. 6C is a block diagram depicting an example embodiment of a system for providing security to file storage by an external storage provider.

Referring now to FIG. 6C, an example embodiment of a system for accessing secured files from an external storage provider on behalf of a user is depicted. In brief overview, a user authorized to access a location initiates a request (depicted at 668) for an encrypted data file 660 via a process. In some arrangements, the request may be addressed to a virtual disk volume 664. The virtual disk volume 664 may have been mounted such that files stored by an external storage provider may be accessed (e.g., by requesting files from the virtual disk volume). The security component 666 may intercept request for the file. The request may then be passed to the virtual disk volume 664 in order for the virtual disk volume 664 to retrieve the encrypted data file 660 from the external storage provider via network 662. The virtual disk volume, upon receiving the encrypted data file 660, may transmit the encrypted data file 660 to the process used by the user to request the file. The security component may intercept the encrypted data file 660 and may decrypt encrypted file 660 and provide the unencrypted data file to the process (providing the data file to the process is depicted at 670).

In some embodiment, the security component may determine whether a particular user attempting to access the virtual disk volume 664 is authorized to access the location. The security component may also determine whether a particular application or process is authorized to access the virtual disk volume 664.

In some embodiments, the location at which to mount the virtual disk volume is a network mount location. The location at which to mount the virtual disk volume may also be a secure network mount location.

Figure 7:
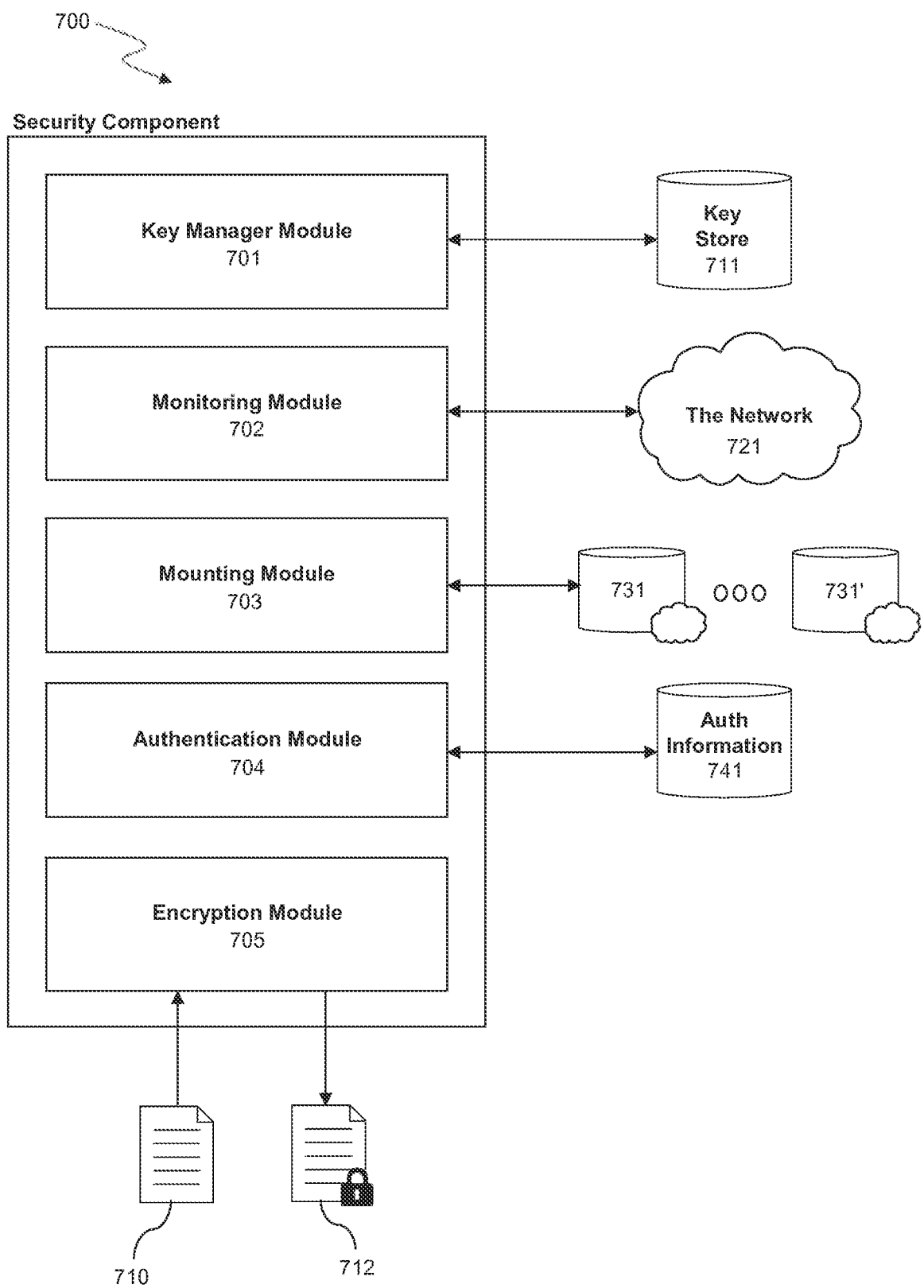
FIG. 7 is a block diagram depicting an example of a security component.

Referring now to FIG. 7, an example block diagram of a security component is depicted. A security component 700 may comprise one or more of the following: a key manager module 701, a monitoring module 702, a mounting module 703, an authentication module 704, or an encryption module 705. The key manager module may operate in communication with a key store 711. The monitoring module 702 may operate in communication with the network. The mounting module 703 may operate in communication with virtual disk volumes, such as virtual disk volume 731 and 731' that are mounted at various locations on the network. The authentication module 704 may operate in communication with a storage location for authentication information 741. The encryption module may operate in communication with unencrypted data files 710 and encrypted files 712.

In one embodiment, each module of security component 700 may run on a machine of an enterprise network, such as a machine that is at the edge of the enterprise network (e.g., machine 18). In other embodiments, security component 700 may run as a single process or as multiple processes on either a single machine or a plurality of machines.

In some embodiments, each module of the security component may run as a single process or as multiple processes on either a single machine or a plurality of machines.

In one or more embodiments, the key manager module 701 may be responsible for assigning and keeping track of encryption keys used by the security component.

In some embodiments, key manager module 701 may operate in communication with a key generation unit, which may generate encryption keys with which to encrypt files.

In one embodiment, the monitoring module 702 may be responsible for monitoring the network, as well as the usage of the security component. The monitoring module 702 may track the usage of the security component and may generate reports and information on usage of the security component and the network.

In some embodiments, the monitoring module 702 may operate in communication with an auditing system. The auditing system may be used for the purposes of conducting audits and compliance checks.

In one embodiment, the mounting module 703 may be responsible for assigning locations for the virtual disk volumes. The mounting module may operate in communication with the authentication module 704 in order to determine whether particular users or applications are authorized to use various locations. The mounting module may generate new locations for the virtual disk volumes.

In one or more embodiments, the authentication module 704 may be responsible for authenticating whether a particular user or application is authorized to access a given location. The authentication module may operate in communication with a database 741 providing authentication information. The authentication information used by authentication module may be any form of authentication information, whether audience class information, access list information, groups information, directory structure information, and the like.

In some embodiments, the authentication module 704 may be responsible for determining whether a particular user or application is authorized to access a given encrypted file.

In one or more embodiments, encryption module 705 may be responsible for encrypting a data file 710 into an encrypted file 712. The encryption module may use any form of encryption known in the art. The encryption module may add tags or additional information to the meta-data associated with the encrypted file 712, such as audience class identifiers and/or an encrypted version of the encryption key used to encrypt the encrypted file.

The security component may operate in communication with a centralized service (e.g., centralized service 24). The centralized service may provide services for securing file transfer between an external storage provider and a plurality of computers.

Figure 8A:
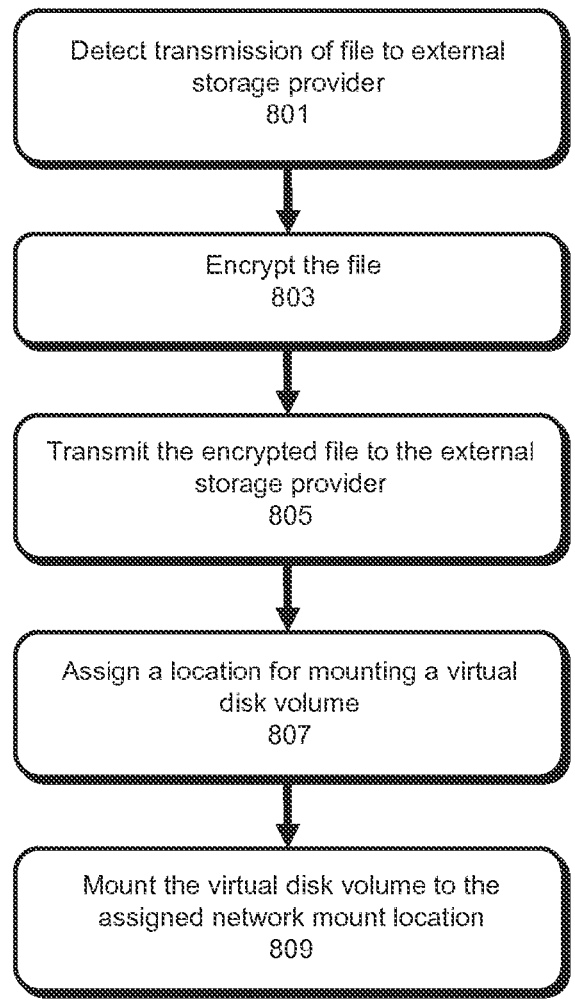
FIG. 8A-8B are flow diagrams depicting example methods for providing security to file storage by an external storage provider involving encryption and decryption.

Referring now to FIG. 8A, an example method for securing a file for transmission to an external storage provider is depicted. At step 801, a security component may detect transmission of a file to an external storage provider. In some arrangements, the security component may detect transmission of a different type of message, such as a request to store the file that is being sent to the external storage provider. Such a request may be addressed to the external storage provider and may identify the file or include at least a portion of the file's data. At step 803, the security component may encrypt the file. At step 805, the security component may transmit the file to the external storage provider. At step 807, the security component may assign a location for mounting a virtual disk volume exposed by the external storage provider. At step 809, the security component may mount the virtual disk volume to the assigned location. Further details of these steps will now be described.

In some embodiments, a security component may detect transmission of a file to an external storage provider by, for example, operating as a listener process that waits for an attempted transmission of a file to an external storage provider. In some embodiments, security component may accomplish the detection of a file transmission by, for example, operating on an intermediary network machine and inspecting incoming network traffic. In some embodiments, detection of the file transmission may include routing all internet traffic to particular network nodes capable of detecting transmission of files to external storage providers. In some variations, detection of the file transmission may be accomplished at a network firewall or other network appliance. In some embodiments, detection of the file transmission may occur at a client machine, one or more machines on the enterprise network, or one or more machines accessible to the network over the Internet.

In some embodiments, a security component may encrypt a file by, for example, utilizing a unique encryption key generated specifically for encrypting the file. Encryption of the file may occur at an intermediary network device, any machine one the enterprise network, a plurality of machines, or one or more machines accessible via the Internet. A security component may accomplish the encryption of the file in consultation with a centralized service, a key generator, a key store, an access list, and audience class database, or any other authentication or encryption services or resources.

In some embodiments, a security component may transmit an encrypted file to an external storage provider by transmitting the file over the Internet. In some embodiments, transmission of the encrypted file may include sending a request to the external storage provider to upload the encrypted file to a particular location. In some embodiments, the transmission of the encrypted file may include placing the encrypted files somewhere on the client machine or enterprise network and transmitting the file to the external storage provider according to a predetermined schedule or synchronization protocol.

In some embodiments, a security component may assign a location for mounting a virtual disk volume using a copy or representation of the stored encrypted file. In some embodiments, assigning the location for mounting the virtual disk volume may be accomplished by using network mounting protocols available on a plurality of operating systems. In some embodiments, assigning the location for mounting the virtual disk volume may include running a particular process or application that acts as a network drive. In other embodiments, assigning the location for mounting the virtual disk volume may include running a process or application that provides a copy or representation on an encrypted file stored by the external storage provider to a user.

In some embodiments, the security component may mount the virtual disk volume to the assigned location. In some embodiments, mounting the virtual disk volume may be accomplished by using network mounting protocols available on a plurality of operating systems. In some embodiments, mounting the virtual disk volume may include running a particular process or application that acts as a network drive. In other embodiments, mounting the virtual disk volume may include running a process or application that provides a copy or representation of the file stored by the external storage provider to a user. In some embodiments, mounting a virtual disk volume may include making available, by any means, a copy or representation of a file stored by an external storage provider to a user, process, or application. A virtual disk volume may be mounted at any node in a network, on a client machine, a user's desktop, a network drive, or any other location on a network where a copy or representation of a file stored by an external storage provider may be located.

Figure 8B:
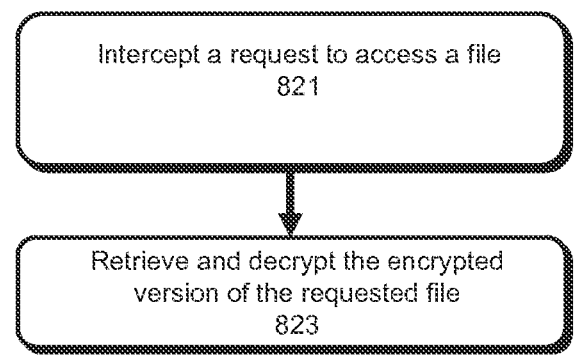

Referring now to FIG. 8B, an example method for accessing a secure file stored by an external storage provider via a virtual disk volume is depicted. At step 821, the security component may intercept a request to access a file. At step 823, the security component may retrieve the encrypted version of the file from the external storage provider and may decrypt the encrypted file. Upon decrypting the file, the security component may provide the file to the requesting process, user and/or machine. Further details of these steps will now be discussed.

In some embodiments, the security component may intercept a request to access an encrypted file by, for example, running as a listener process that waits for a request. In some embodiments, intercepting the request to access a file may occur at a client machine, one or more intermediary network devices, machines, or appliances, or one or more machines accessible across the Internet. In some embodiments, intercepting the request to access a file may include routing all network traffic through particular nodes on a network capable of intercepting requests to access an encrypted file. In some embodiments, intercepting the request to access a file could be accomplished by running a process or application which monitors virtual disk volumes mounted to the network. In some embodiments, intercepting the request to access a file may be accomplished by an application or process running on client machines.

In some embodiments, the security component may retrieve and decrypt an encrypted version of the requested file by, for example, transmitting a request for the encrypted file from the external storage provider and consulting a centralized service for the decryption key. In some embodiments, the security component may decrypt the encrypted file by using a unique key generated for the encrypted file. The unique key may be stored by the centralized service. In some embodiments, decrypting the encrypted file may include consulting an audience class database, an access list, a key store, and key generator, or any other application or resource available for encryption and authentication. retrieving and decrypting the encrypted version of the requested file may occur at an intermediary network device, any machine one the enterprise network, a plurality of machines, or one or more machines accessible via the Internet. In some embodiments, the security component may perform step 823 responsive to a determination that a user, application, or process is authorized to access either an encrypted file or a particular location.

Figure 8C:
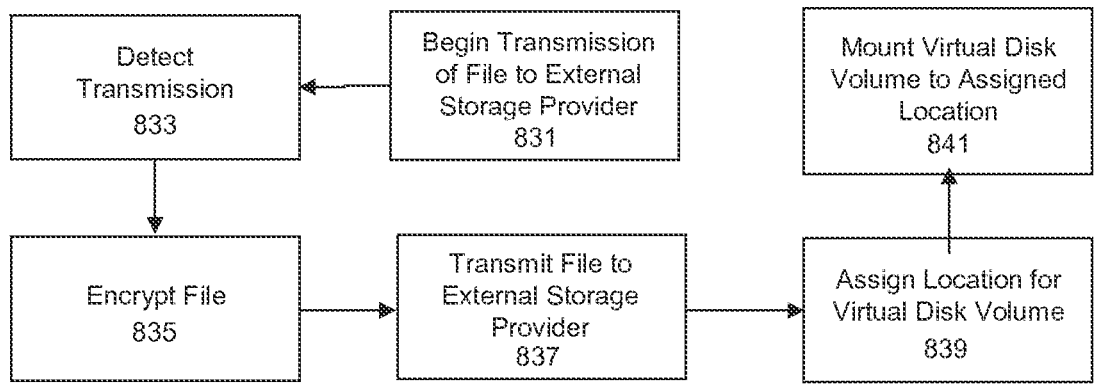
FIG. 8C-8D are flow charts depicting example methods for providing security to file storage by an external storage provider involving encryption and decryption.

Referring now to FIG. 8C, an example method for securing a file for transmission to an external storage provider is depicted. At step 831, A client machine, user, application, or process may begin transmission of a file to an external storage provider from the enterprise network. At step 833, a security component may detect the transmission. At step 835, the security component may encrypt the file. At step 837, the security component may transmit the encrypted file to the external storage provider. At step 839, the security component may assign a location for a virtual disk volume. At step 841, the security component may mount the virtual disk volume exposed by the external storage provider to the assigned location.

Figure 8D:
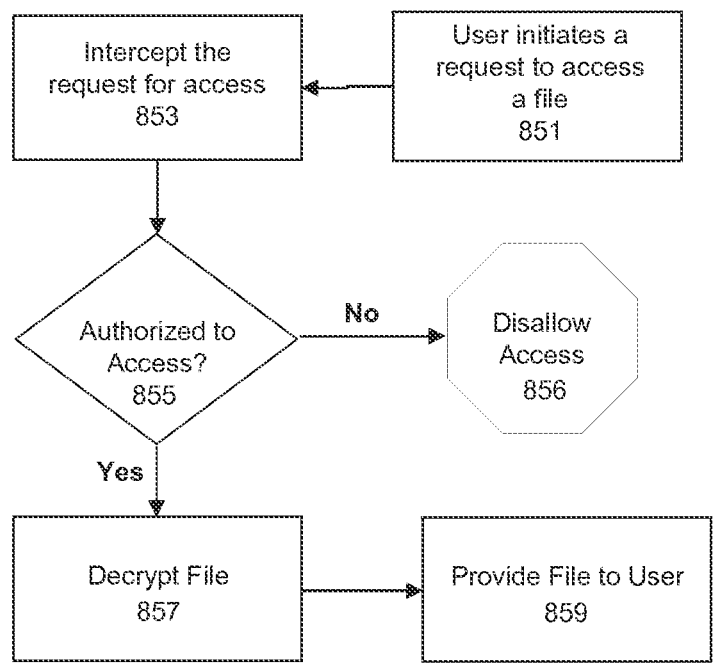

Referring now to FIG. 8D, an example method for accessing a secure file stored by an external storage provider via a mounted virtual disk volume is depicted. At step 851, a user may initiate a request to access a file stored by the external storage provider, such as, for example, via an interaction with the virtual disk volume. At step 853, the security component may intercept the request for access. At step 855, the security component may determine whether there is authorization to access the virtual disk volume, such as whether the user, a process or machine has access to the virtual disk volume. If not authorized to access the given location, access to the virtual disk volume may be disallowed at step 856 and thus access to the file may also be disallowed. If authorized to access the virtual disk volume, the method may proceed and, at step 857, the security component may retrieve the file from the external storage provider (where it may be stored in an encrypted form) and decrypt the file (if needed). At step 859, the security component may provide the unencrypted file to the user.

In some embodiments, a request to access a file stored by an external storage provider may be made by an application or process. The security component may determine whether a given application, process, or machine is authorized to access a particular virtual disk volume.

Figure 9A:
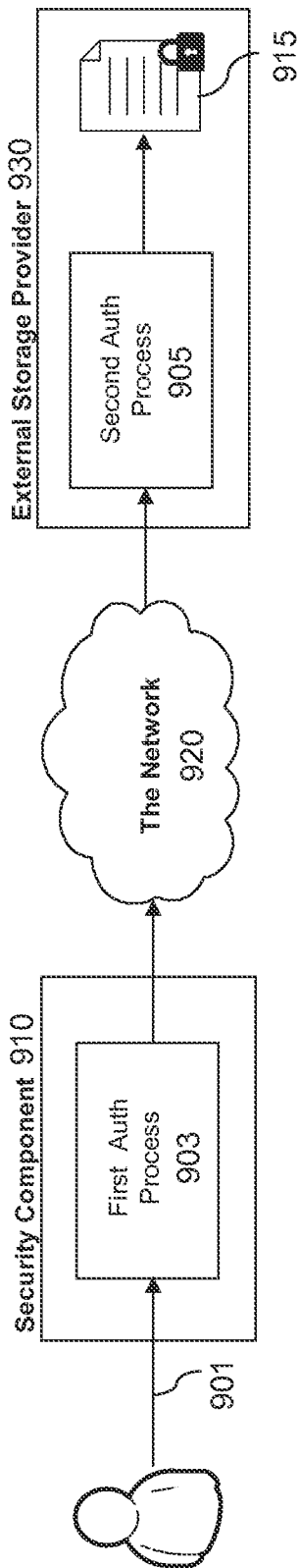
FIG. 9A is a block diagram of an example embodiment of a system for authenticating users to access secured files stored by an external storage provider.

Referring now to FIG. 9A, an example embodiment of a system for authenticating access to files stored by an external storage provider is depicted. A user may make a request (depicted as line 901) for a file stored by external storage provider 930. The security component 910 may implement a first authentication process 903 to determine that the user is authorized to access the encrypted file stored by the external storage provider. If authorized, the security component 910 may provide the request to the external storage provider 930 via network 920. The external storage provider may implement a second authentication process 905 to determine that the user is authorized to access encrypted file 915.

In some embodiments, the first authentication process 903 may include determining that a particular user is authorized to access a particular location. The first authentication process 903 may also include determining that the user is authorized to access the encrypted file 915 itself.

In some embodiments, the first authentication process 903 may determine that a particular application, process or machine, is authorized to access a particular location or encrypted file.

In some embodiments, the second authentication process 905 may determine that a particular application, process or machine, is authorized to access a particular location or encrypted file.

Figure 9B:
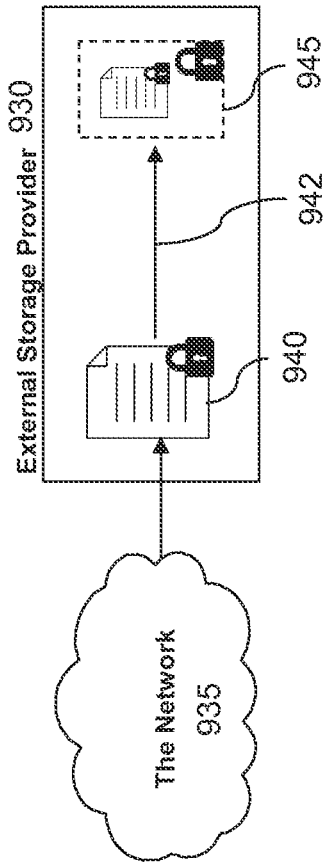
FIG. 9B is a block diagram depicting an example embodiment of a system for further encryption of secured files by an external storage provider.

Referring now to FIG. 9B, an example embodiment of a system for further encrypting an encrypted file at the external storage provider is depicted. An external storage provider 930 may receive an encrypted file 940 from an enterprise network (not shown) via a network 935. The external storage provider 930 may further encrypt the encrypted file 940 into encrypted file 945 (encryption depicted as line 942). The external service provider 930 may similarly decrypt encrypted file 945 into encrypted file 940 upon a request from the enterprise network to access the file and, therefore, the external service provider may respond to the request by transmitting encrypted file 940 to the enterprise network.

In some embodiments, the external storage provider 930 may further encrypt the encrypted file 940 before the encrypted file leaves the enterprise network and before transmission over the public Internet. In such embodiments, the external storage provider may decrypt the encrypted file 945 upon a request to access the file only after it has been transmitted back to the enterprise network over the public Internet.

Having described certain embodiments of systems and methods for providing secure handling of data accessed by synchronization programs, it will now become apparent to one of skill in the art that other embodiments incorporating the concepts of the invention may be used.

We claim:

1. A method, comprising:
   intercepting, by a first security agent executing on a first client computer, a message from a first process executing on the first client computer, wherein the message is addressed to an external storage provider, and wherein the message identifies a file; and
   responding to the intercepting by at least
      encrypting, by the first security agent, the file using a first encryption key, resulting in an encrypted file,
      encrypting, by the first security agent, the first encryption key with a shared key, resulting in an encrypted first encryption key, and
      causing storage of the encrypted file and the encrypted first encryption key to a location accessible to the first process.

2. The method of claim 1, further comprising:
   tagging the encrypted file with an audience class that specifies which requestors are authorized to access the file.

3. The method of claim 2, further comprising:
   intercepting, by a second security agent executing on a second client computer, a file access request that requests access to the file which was previously encrypted by the first security agent;
   determining that the file access request is authorized based on the audience class;
   decrypting, by the second security agent, the encrypted first encryption key with the shared key; and
   decrypting, by the second security agent, the encrypted file with the first encryption key.

4. The method of claim 1, further comprising:
   determining that the first process intends to perform at least one the following: synchronize the file to a network copy of the file, store a copy of the file to a network, or transmit a copy of the file via a network.

5. The method of claim 1, wherein causing storage of the encrypted file and the encrypted first encryption key to the location accessible to the first process includes causing storage of a tagged file to the location accessible to the first process, wherein the tagged file includes the encrypted file, the encrypted first encryption key, and an audience class identifier assigned to the encrypted file.

6. The method of claim 1, further comprising:
   using an access list to determine whether access to the file is authorized.

7. The method of claim 1, further comprising:
   adding an identifier for the file to an access list that lists one or more authorized files a requestor may access.

8. The method of claim 1, further comprising:
   obtaining the shared key from a centralized service in communication with the first security agent.

9. The method of claim 1, wherein the message is a file access request that requests access to the file that is being stored by the external storage provider, or the message is a file storage request that requests the file be stored by the external storage provider.

10. The method of claim 1, wherein the first process is an untrusted program.

11. An apparatus, comprising:
   one or more processors; and
   memory storing computer readable instructions configured to, when executed by the one or more processors, cause the apparatus to:
      intercept a message from a first process executing on a first client computer, wherein the message is addressed to an external storage provider, and wherein the message identifies a file; and
      respond to the intercept by at least
         encrypting the file using a first encryption key, resulting in an encrypted file,
         encrypting the first encryption key with a shared key, resulting in an encrypted first encryption key, and
         causing storage of the encrypted file and the encrypted first encryption key to a location accessible to the first process.

12. The apparatus of claim 11, wherein the computer readable instructions are configured to, when executed by the one or more processors, cause the apparatus to:
   tag the encrypted file with an audience class that specifies which requestors are authorized to access the file.

13. The apparatus of claim 11, wherein the computer readable instructions are configured to, when executed by the one or more processors, cause the apparatus to:

determine that the first process intends to perform at least one the following: synchronize the file to a network copy of the file, store a copy of the file to a network, or transmit a copy of the file via a network.

14. The apparatus of claim 11, wherein causing the apparatus to cause storage of the encrypted file and the encrypted first encryption key to the location accessible to the first process comprises causing the apparatus to cause storage of a tagged file to the location accessible to the first process, wherein the tagged file includes the encrypted file, the encrypted first encryption key, and an audience class identifier assigned to the encrypted file.

15. The apparatus of claim 11, wherein the computer readable instructions are configured to, when executed by the one or more processors, cause the apparatus to:
use an access list to determine whether access to the file is authorized.

16. The apparatus of claim 11, wherein the computer readable instructions are configured to, when executed by the one or more processors, cause the apparatus to:
add an identifier for the file to an access list that lists one or more authorized files a requestor may access.

17. The apparatus of claim 11, wherein the computer readable instructions are configured to, when executed by the one or more processors, cause the apparatus to:
obtain the shared key from a centralized service in communication with the apparatus.

18. The apparatus of claim 11, wherein the message is a file access request that requests access to the file that is being stored by the external storage provider, or the message is a file storage request that requests the file be stored by the external storage provider.

19. A method, comprising:
intercepting, by a first security agent executing on a first client computer, a file storage request from a first program executing on the first client computer, wherein the file storage request is addressed to an external storage provider in communication with the first program, and wherein the file storage request requests the external storage provider store a file;
encrypting, by the first security agent, the file using a first encryption key, resulting in an encrypted file; and
causing storage of the encrypted file and an encrypted version of the first encryption key to the external storage provider.

20. The method of claim 19, further comprising:
assigning a location for mounting a virtual disk volume, resulting in an assigned mount location;
mounting the virtual disk volume to the assigned mount location;
providing access to the encrypted file using the virtual disk volume;
intercepting a request to access the encrypted file via the virtual disk volume;
retrieving the encrypted file from the external storage provider; and
decrypting the encrypted file.

* * * * *